(12) United States Patent
Yonezawa et al.

(10) Patent No.: US 11,556,729 B2
(45) Date of Patent: Jan. 17, 2023

(54) INFORMATION PROCESSING APPARATUS, CONTROL METHOD, AND PROGRAM

(71) Applicant: NEC Corporation, Tokyo (JP)

(72) Inventors: Yaeko Yonezawa, Tokyo (JP); Akiko Kubo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 215 days.

(21) Appl. No.: 16/982,143

(22) PCT Filed: Mar. 1, 2019

(86) PCT No.: PCT/JP2019/008170
§ 371 (c)(1),
(2) Date: Sep. 18, 2020

(87) PCT Pub. No.: WO2019/181442
PCT Pub. Date: Sep. 26, 2019

(65) Prior Publication Data
US 2021/0192269 A1    Jun. 24, 2021

(30) Foreign Application Priority Data
Mar. 20, 2018   (JP) .............................. JP2018-053452

(51) Int. Cl.
  *G06K 9/00*   (2022.01)
  *G06K 9/62*   (2022.01)
  *G06T 7/00*   (2017.01)
(52) U.S. Cl.
  CPC .......... *G06K 9/6215* (2013.01); *G06K 9/627* (2013.01); *G06K 9/6217* (2013.01); *G06T 7/001* (2013.01)

(58) Field of Classification Search
  CPC .... G06K 9/6215; G06K 9/6217; G06K 9/627; G06T 7/001; G06V 20/52
  See application file for complete search history.

(56) References Cited

U.S. PATENT DOCUMENTS

| 2015/0193759 A1* | 7/2015 | Fukuda | G07G 1/0036 705/23 |
| 2016/0171300 A1* | 6/2016 | Takemoto | G06V 40/197 382/117 |
| 2018/0068168 A1* | 3/2018 | Miyakoshi | G06K 9/6215 |

FOREIGN PATENT DOCUMENTS

| CN | 104766416 A | 7/2015 |
| EP | 3035240 A1 | 6/2016 |
| JP | 2001-256570 A | 9/2001 |
| JP | 2004-086625 A | 3/2004 |
| JP | 2004-127157 A | 4/2004 |
| JP | 2015-127853 A | 7/2015 |
| JP | 2016-115108 A | 6/2016 |

(Continued)

OTHER PUBLICATIONS

Japanese Office Action for JP Application No. 2020-508131 dated Oct. 19, 2021 with English Translation.

(Continued)

*Primary Examiner* — Samir A Ahmed

(57) ABSTRACT

A information processing apparatus (2000) includes a determination unit (2160) and a deletion unit (2180). The determination unit (2160) determines whether feature information to be determined satisfies a predetermined condition. When feature information to be determined is determined to satisfy the predetermined condition, the deletion unit (2180) deletes the feature information to be determined from the storage apparatus (120).

9 Claims, 19 Drawing Sheets

(56) References Cited

FOREIGN PATENT DOCUMENTS

| JP | 2016-185845 A | | 10/2016 |
|----|---------------|---|---------|
| WO | WO-2016/052383 A1 | | 4/2016 |
| WO | 2016/158438 | * | 10/2016 |
| WO | WO-2018/016214 A1 | | 1/2018 |

OTHER PUBLICATIONS

International Search Report corresponding to PCT/JP2019/008170, dated May 21, 2019 (5 pages).
Japanese Office Action for JP Application No. 2020-508131 dated Apr. 26, 2022 with English Transiation.

* cited by examiner

FIG. 7
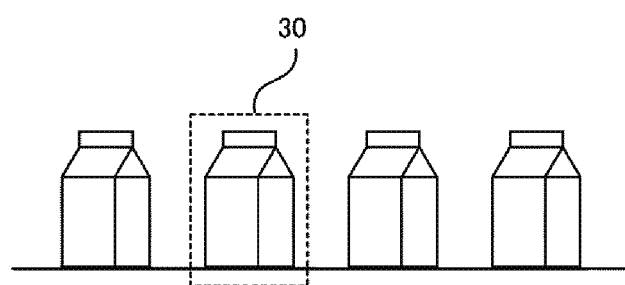
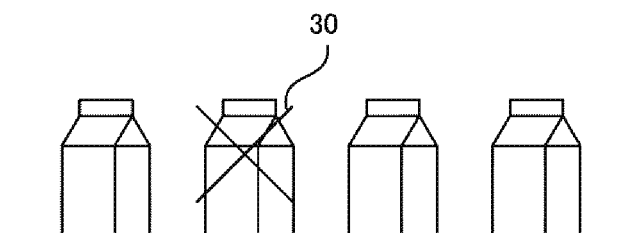

FIG. 9
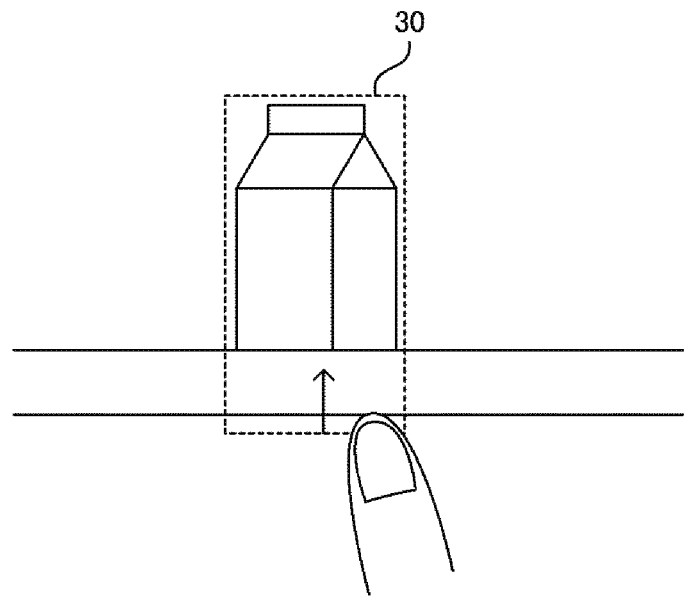
DEFORM FIRST DISPLAY 30
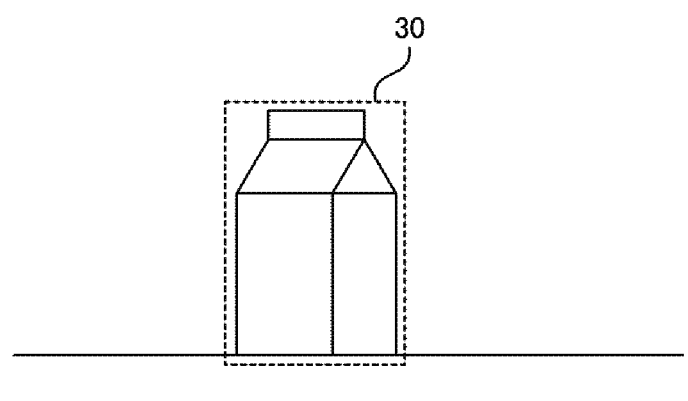
SHAPE OF PARTIAL IMAGE 14 IS ALSO CHANGED
ACCORDING TO SHAPE OF FIRST DISPLAY 30

FIG. 10
| PRODUCT IDENTIFICATION INFORMATION | PRODUCT NAME | PRICE | TYPE | MAKER | FEATURE INFORMATION |
|---|---|---|---|---|---|
| ID0001 | ABC TEA | 150 | BEVERAGE | A CORPORATION | , IMAGE FEATURE f1 ), ... |
| ID0002 | DEF COFFEE | 100 | BEVERAGE | B CORPORATION | , IMAGE FEATURE f2 ), ... |
| ... | ... | ... | ... | ... | ... |

FIG. 15
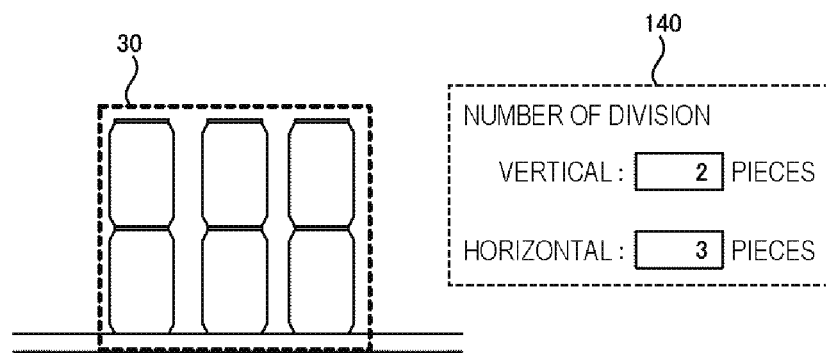
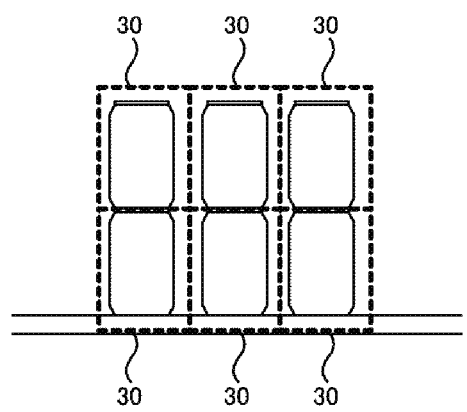
PERFORM DIVISION BY SPECIFIED NUMBER OF DIVISION

INFORMATION PROCESSING APPARATUS, CONTROL METHOD, AND PROGRAM

TECHNICAL FIELD

This application is a national stage application of International Application No. PCT/JP2019/008170 entitled, "INFORMATION PROCESSING APPARATUS, CONTROL METHOD, AND PROGRAM," filed on Mar. 1, 2019, which claims priority to Japanese Patent Application No. 2018-053452, filed on Mar. 20, 2018. The entire contents of these applications are incorporated herein by reference in their entirety.

Embodiments of the present invention relate to management of products.

BACKGROUND ART

At stores, such as a convenience store and a supermarket, products are displayed in display spaces. Information processing technologies to make more efficient operation relating to such display of products have been developed. For example, Patent Document 1 discloses a technique for automatically determining whether relationships between products placed in a display space and shelf labels assigned to the display space are correct by recognizing products and price tags from a captured image in which the display space is captured.

In order to recognize a specific object from a captured image, it is required to prepare information (hereinafter, referred to as feature information) representing a feature of an appearance of the object in advance. Examples of the feature information include an image of an object. In Patent Document 2, generating, from an image in which an object is included, a master image for use in the detection of the object is described.

RELATED DOCUMENT

Patent Document

[Patent Document 1] International Publication No. 2016/052383

[Patent Document 2] Japanese Patent Application Publication No. 2004-127157

SUMMARY OF THE INVENTION

Technical Problem

A plurality of pieces of feature information are sometimes prepared with respect to one product. This configuration enables precision of product recognition to be improved. On the other hand, there is a problem in that, to prepare a plurality of pieces of feature information with respect to each product, the amount of storage area used increases. Patent Documents 1 and 2 do not mention such a problem.

The present invention has been made in consideration of the above-described problems, and one of objects of the present invention is to provide a technique for reducing the number of pieces of feature information to be prepared for product recognition.

Solution to Problem

An information processing apparatus of the present invention includes: 1) a determination unit that determines whether a predetermined condition is satisfied with respect to feature information of a product, the feature information being stored in a storage apparatus in conjunction with product identification information; and 2) a deletion unit that deletes the feature information with respect to which the predetermined condition is satisfied from the storage apparatus.

The feature information of the product indicates at least one of an image of the product and an image feature extracted from the image of the product.

A control method of the present invention is performed by a computer. The control method includes: 1) a determination step of determining whether a predetermined condition is satisfied with respect to feature information of a product, the feature information being stored in a storage apparatus in conjunction with product identification information; and 2) a deletion step of deleting the feature information with respect to which the predetermined condition is satisfied from the storage apparatus.

The feature information of the product indicates at least one of an image of the product and an image feature extracted from the image of the product.

A program of the present invention causes a computer to perform respective steps that the control method of the present invention includes.

Advantageous Effects of Invention

The present invention enables a technique for reducing the number of pieces of feature information to be prepared for product recognition to be provided.

BRIEF DESCRIPTION OF THE DRAWINGS

The above-described object and other objects, features, and advantages will be more apparent by the preferred example embodiments described below and the following drawings accompanying therewith.

FIG. 7 is a diagram illustrating variations of a first display.

FIG. 9 is a diagram illustrating operation of changing the shape of a partial image.

FIG. 10 is a diagram illustrating pieces of product information in a table form.

FIG. 15 is a diagram illustrating a case of receiving input of division numbers.

DESCRIPTION OF EMBODIMENTS

Hereinafter, example embodiments of the present invention will be described by use of the drawings. In all the drawings, the same signs are assigned to the same constituent elements, and a description thereof will be appropriately omitted. Unless specifically described, in block diagrams, each block represents a component as a functional unit instead of a hardware unit.

In the following description, unless specifically described, various types of predetermined values are stored in advance in a storage apparatus that is accessible from functional constituent units using the predetermined values.

First Example Embodiment

<Outline>

Figure 1:
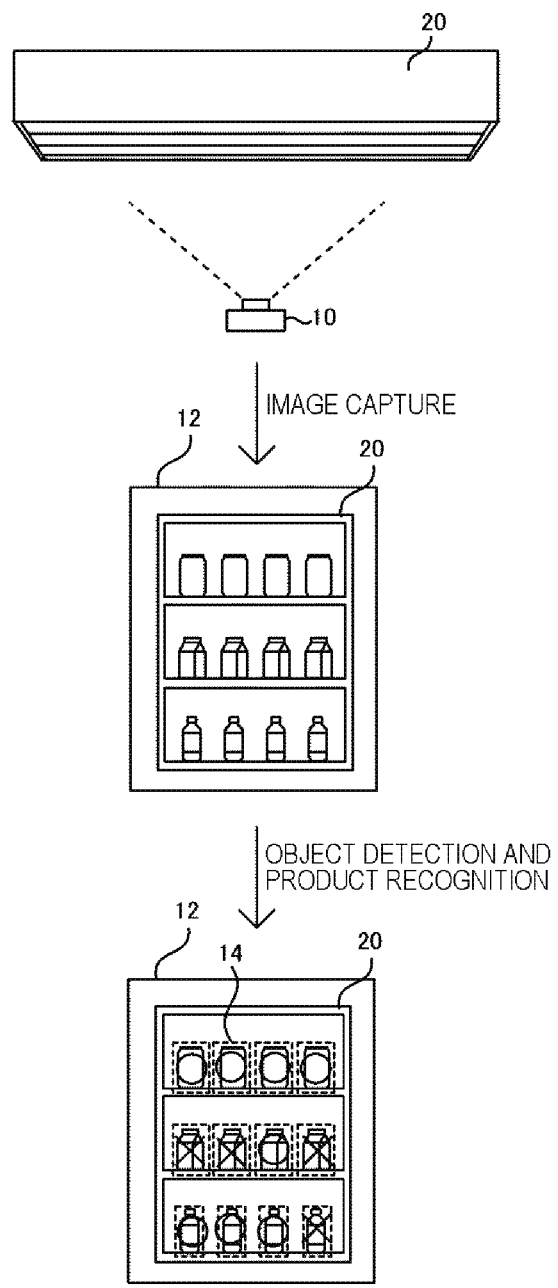
FIG. 1 is a diagram conceptually illustrating operation of an information processing apparatus according to a first example embodiment.
Figure 2:
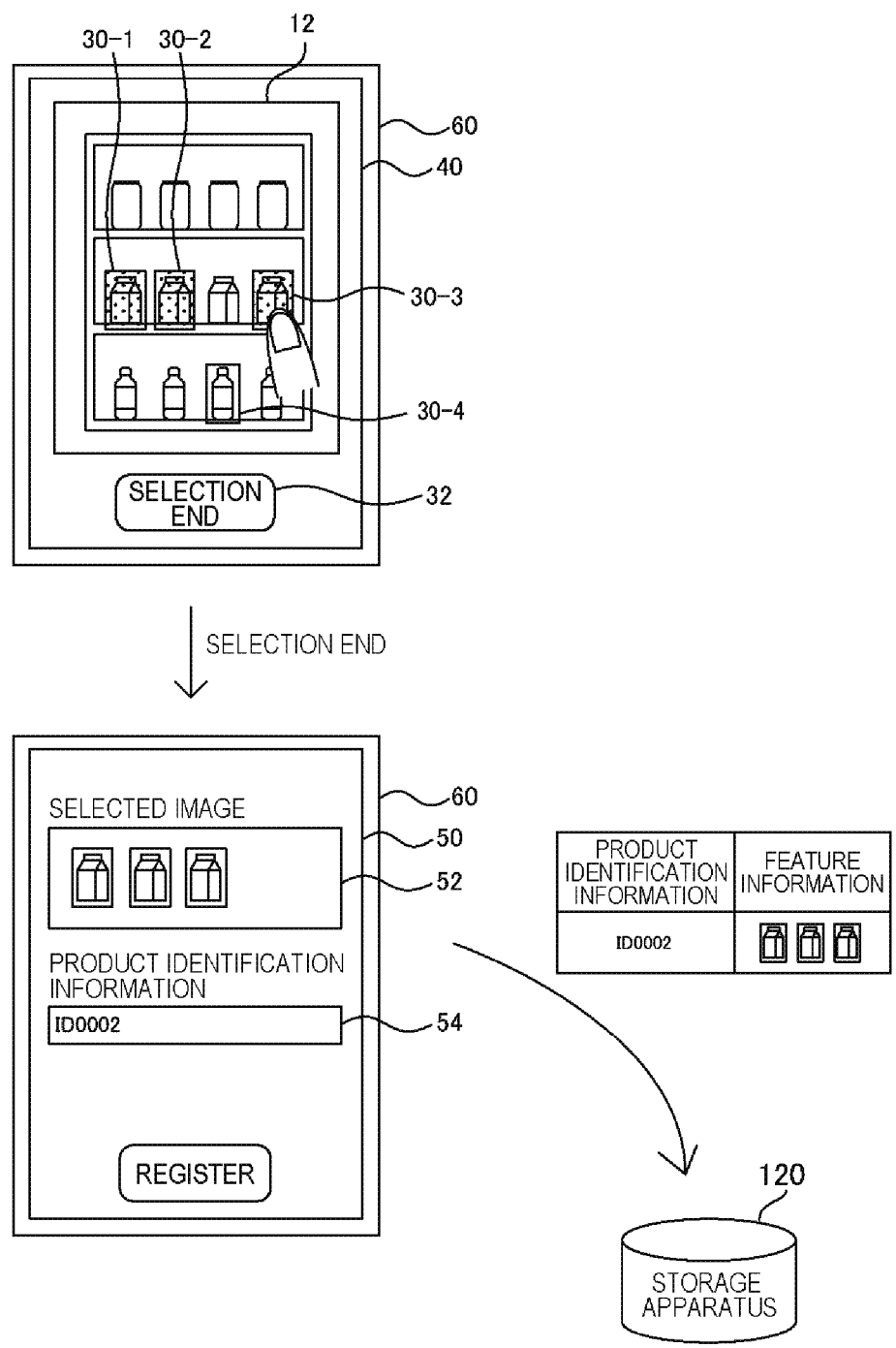
FIG. 2 is another diagram conceptually illustrating the operation of the information processing apparatus of the first example embodiment.

FIGS. 1 and 2 are diagrams conceptually illustrating operation of an information processing apparatus (an information processing apparatus 2000 the configuration of which will be illustrated in FIG. 3) according to a first example embodiment. The operation of the information processing apparatus 2000 that will be described below by use of FIGS. 1 and 2 is an exemplification for facilitating understanding of the information processing apparatus 2000 and does not limit the operation of the information processing apparatus 2000. Details and variations of the operation of the information processing apparatus 2000 will be described later.

The information processing apparatus 2000 acquires a captured image in which a display space where products are displayed is captured. In FIG. 1, as a result of a camera 10 capturing an image of a display space 20, a captured image 12 is generated. In the captured image 12, the display space 20 and products displayed in the display space 20 are contained. Note that a display space that the information processing apparatus 2000 sets as a target only has to be a place where products are displayed and is not limited to a display space that has a plurality of shelves as illustrated in FIG. 1. In a case where, for example, products are stacked flat on a table, the table is treated as a display space.

From the captured image 12, a plurality of partial images in each of which an object is contained are detected. For example, in FIG. 1, a plurality of partial images 14 are detected as image regions each of which contains an object therein. Note that, in order to avoid the drawing from becoming complicated, a reference sign 14 is assigned to only one of the plurality of partial images.

Further, with respect to each of the partial images 14, processing of recognizing an object in the partial image 14 as a product is performed. In FIG. 1, a circle is marked on each partial image 14 where an object contained therein was recognized as a product, and a cross is marked on each partial image 14 where an object contained therein was not recognized as a product.

Recognition of a product is performed by use of product information. The product information associates product identification information with feature information. The product identification information is, for example, an identifier, such as an identification number, that is assigned to a product. The feature information is information representing a feature of an appearance of a product. For example, feature information indicates an image of a product (hereinafter, referred to as a product image) or an image feature that is extracted from a product image. Note that the processing of performing detection of objects and recognition of products with respect to a captured image 12 may be performed by the information processing apparatus 2000 or an apparatus other than the information processing apparatus 2000. In the following description, in order to make the description clearer, the description will be made assuming that the detection of objects and the recognition of products are performed by the information processing apparatus 2000, unless otherwise stated.

There may exist a partial image 14 where an object contained therein is not recognized as a product. For example, when a product the product information of which has not been generated (for example, a product that is newly put on sale) is displayed in the display space 20, the product cannot be recognized from any partial image 14 representing the product. Alternatively, for example, in a case of a product the feature of the appearance of which differs depending on the viewing direction, the product cannot be recognized unless feature information representing a feature of an appearance of the product contained in the captured image 12 is included in product information of the product.

As an example, it is assumed that, with respect to a product the appearance of which greatly differs between the front view and the side view, only an image viewed from the front is included in product information. In this case, when the product is displayed in the display space 20 in such a manner that a side face thereof faces the front, a partial image 14 representing the side view of the product is included in a captured image 12 and a partial image 14 representing the front view of the product is not included in the captured image 12. Therefore, the product cannot be recognized from the captured image 12.

The information processing apparatus 2000 performs, with respect to an object that was not recognized as a product as described above, association of the product identification information of the object with feature information of the object. First, the information processing apparatus 2000 displays, on a display apparatus 60, a first display 30 that represents a partial image 14 where an object contained therein was not recognized as a product. FIG. 2 is a diagram illustrating a situation in which first displays 30 are displayed on the display apparatus 60. In FIG. 2, a selection screen 40 is displayed on the display apparatus 60. In the selection screen 40, a captured image 12 on which the first displays 30 are superimposed is included.

The information processing apparatus 2000 receives input for selecting one or more first displays 30. In FIG. 2, three first displays 30, namely a first display 30-1, a first display 30-2, and a first display 30-34, are selected. Since there is a case where a plurality of products of the same type are displayed side by side, it is configured such that selection of a plurality of first displays 30 representing products of the same type enables a plurality of pieces of feature information relating to the products to be collectively included in product information.

The information processing apparatus 2000, upon receiving a predetermined input from a user, ends receiving selection of a first display 30. Hereinafter, the input is referred to as "selection ending operation". For example, in the example in FIG. 2, pressing a button 32 corresponds to the selection ending operation.

In the example in FIG. 2, the information processing apparatus 2000 causes a registration screen 50 to be displayed in response to reception of the selection ending operation. The registration screen 50 includes an object image display area 52 and a product information input area 54. The object image display area 52 is a screen region in which a partial image(s) 14 represented by a selected first display(s) 30 is/are displayed. The product information input area 54 is a screen region in which an input interface for inputting product identification information to be included in registration information is displayed.

The information processing apparatus 2000 stores, in a storage apparatus 120, product identification information input to the product information input area 54 and feature information based on a partial image 14 corresponding to a selected first display in association with each other. The storage apparatus 120 is a storage apparatus that stores, in association with product identification information, feature information representing a feature of an appearance of a product determined by the product identification information. Feature information based on a partial image may be the partial image itself (that is, an image of a product) or an image feature extracted from the partial image.

Advantageous Effects

According to the information processing apparatus 2000 of the present example embodiment, with respect to a captured image 12 in which a display space 20 is captured, a first display 30 that indicates a partial image 14 containing an object that was not recognized as a product is displayed. A user of the information processing apparatus 2000 is, by seeing the first display 30, able to easily recognize which product was not be able to be recognized as a product by image processing. In particular, it is assumed that a plurality of products of the same type are included in the captured image 12 and a product(s) that was/were able to be recognized as a product(s) and a product(s) that was/were not be able to be recognized as a product(s) are included in the plurality of products. In this case, the user of the information processing apparatus 2000 is, by seeing a first display(s) 30, able to easily recognize information lacking to constitute information representing the appearances of the product.

Further, according to the information processing apparatus 2000, performing selection of one or more first displays 30 and input of product identification information causes feature information based on partial images 14 corresponding to the respective selected first displays to be stored in the storage apparatus 120 in association with the input product identification information. This configuration enables the user of the information processing apparatus 2000 to collectively stores, in the storage apparatus 120, one or more pieces of "information lacking to constitute information representing the appearances of the product", the one or more pieces of information having been recognized by seeing the first displays 30, in association with the product identification information of the product. Thus, it is possible to easily generate information required for recognition of a product and make the storage apparatus store the generated information.

The information processing apparatus 2000 will be described below in more detail.

Example of Functional Configuration

Figure 3:
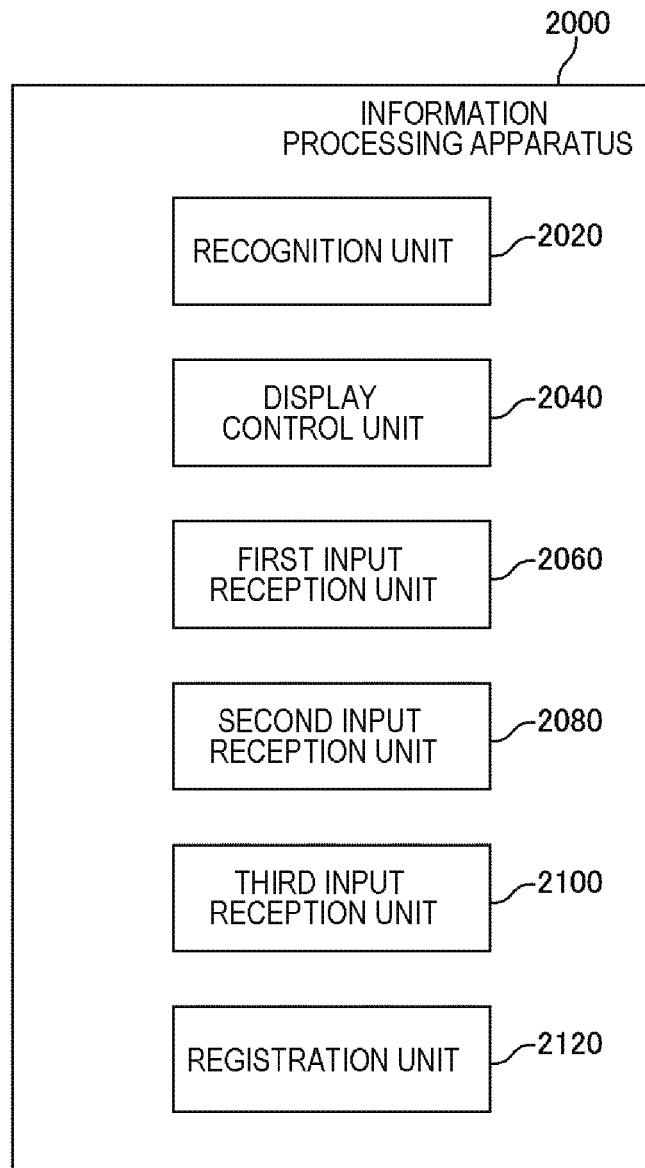
FIG. 3 is a diagram illustrating a functional configuration of the information processing apparatus.

FIG. 3 is a diagram illustrating a functional configuration of the information processing apparatus 2000. The information processing apparatus 2000 includes a display control unit 2040, a first input reception unit 2060, a second input reception unit 2080, a third input reception unit 2100, and a registration unit 2120. The display control unit 2040 displays, on the display apparatus 60, a first display 30. As described afore, the first display 30 represents a partial image where an object contained therein was not recognized as a product. The first input reception unit 2060 receives input for selecting one or more first displays 30. The second input reception unit 2080 receives input of product identification information. The third input reception unit 2100 receives input representing the selection ending operation. The registration unit 2120 stores, in the storage apparatus 120, feature information based on partial image(s) represented by respective first display(s) 30 that has/have been selected before the selection ending operation is received in association with input product identification information. Hereinafter, processing of storing, in the storage apparatus 120, feature information and product identification information in association with each other is also referred to as "registration processing".

As described afore, when processing of performing object detection and product recognition with respect to a captured image 12 is performed by the information processing apparatus 2000, the information processing apparatus 2000 includes a recognition unit 2020 that performs the processing. The recognition unit 2020 extracts a partial image 14 containing an object on the inside thereof from the captured image 12. Further, by performing product recognition with respect to each extracted partial image 14, the recognition unit 2020 recognizes an object contained in the partial image 14 as a product (determines a product corresponding to the object).

Example of Hardware Configuration of Information Processing Apparatus 2000

The functional constituent units of the information processing apparatus 2000 may be achieved by hardware (for example, hardwired electronic circuits) that achieves the functional constituent units or achieved by a combination of hardware and software (for example, a combination of an electronic circuit and a program controlling the electronic circuit). In the following description, a case where the functional constituent units of the information processing apparatus 2000 are achieved by a combination of hardware and software will be further described.

A computer 1000 is one of various types of computers. For example, the computer 1000 is a personal computer (PC), a server machine, a tablet terminal, a smartphone, a head-mounted display, or the like. The computer 1000 may be a dedicated computer designed to achieve the information processing apparatus 2000 or a general-purpose computer.

Figure 4:
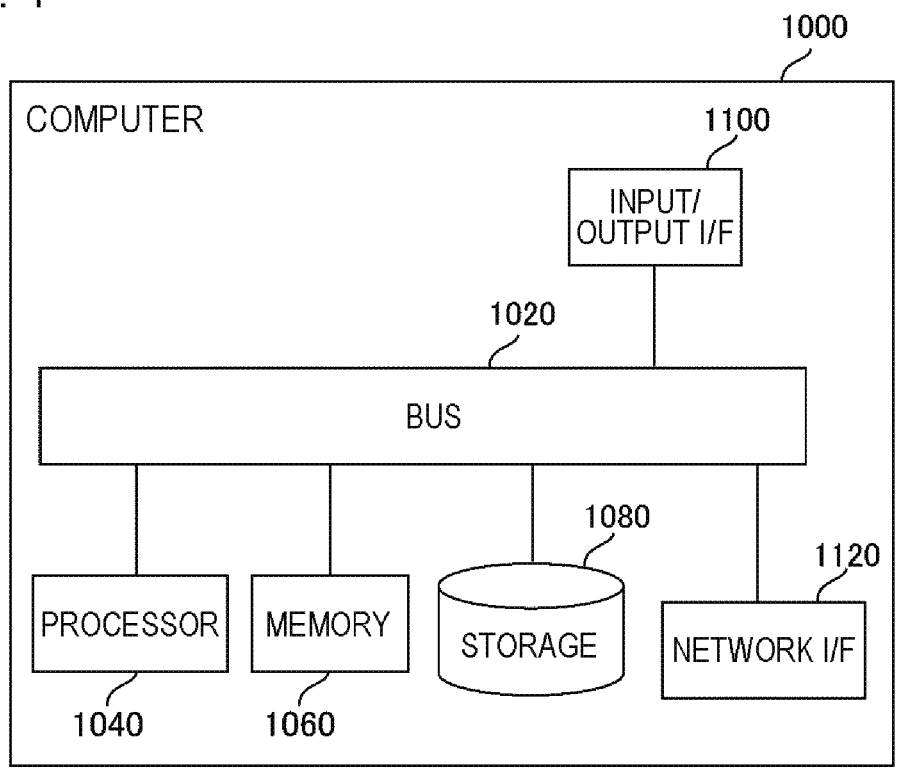
FIG. 4 is a diagram illustrating a configuration of a computer for achieving the information processing apparatus.

FIG. 4 is a diagram illustrating a configuration of the computer 1000 for achieving the information processing apparatus 2000. The computer 1000 includes a bus 1020, a processor 1040, a memory 1060, a storage device 1080, an input/output interface 1100, and a network interface 1120. The bus 1020 is a data transmission line through which the processor 1040, the memory 1060, the storage device 1080, the input/output interface 1100, and the network interface 1120 transmit and receive data to and from one another. However, a method for interconnecting the processor 1040 and the like is not limited to the bus connection. The processor 1040 is a processor constituted by a central processing unit (CPU), a graphics processing unit (GPU), or the like. The memory 1060 is a main storage constituted by a random access memory (RAM) or the like. The storage device 1080 is an auxiliary storage constituted by a hard disk, a solid state drive (SSD), a memory card, a read only memory (ROM), or the like. The input/output interface 1100 is an interface for connecting the computer 1000 and input/output devices to each other. For example, to the input/output interface 1100, input devices, such as a keyboard, and output devices, such as a display apparatus, are connected. The network interface 1120 is an interface for connecting the computer 1000 to a network. The network is, for example, a local area network (LAN) or a wide area network (WAN). A method by which the network interface 1120 connects to a network may be wireless connection or wired connection.

The storage device 1080 stores program modules that implement respective functions of the information processing apparatus 2000. The processor 1040 achieves the respective functions corresponding to the program modules by executing the program modules.

<On Camera 10>

The camera 10 is any type of image capturing device that is capable of performing image capturing and generating an image representing a result of the image capturing. For example, the camera 10 is a camera mounted on a smartphone, a tablet terminal, or the like.

<On Display Apparatus 60>

The display apparatus 60 is any type of display apparatus. For example, the display apparatus 60 is mounted on a smartphone, a tablet terminal, or the like in conjunction with the camera 10.

<Processing Flow>

Figure 5:
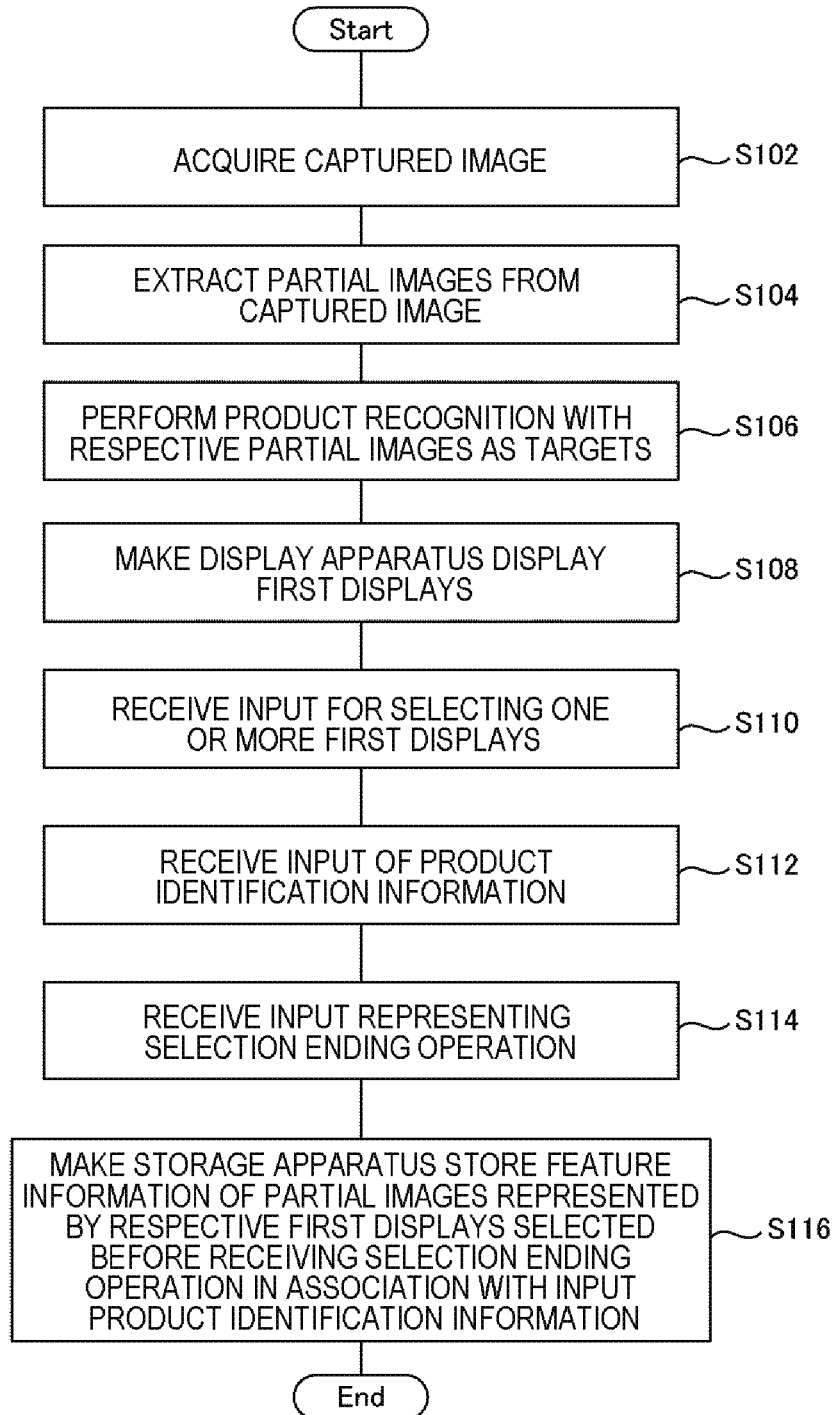
FIG. 5 is a flowchart illustrating a processing flow that is performed by the information processing apparatus of the first example embodiment.

FIG. 5 is a flowchart illustrating a processing flow that is performed by the information processing apparatus 2000 of the first example embodiment. In FIG. 5, the information processing apparatus 2000 is assumed to include the recognition unit 2020. The recognition unit 2020 acquires a captured image 12 (S102). The recognition unit 2020 extracts partial images 14 from the captured image 12 by performing object detection on the captured image 12 (S104). The recognition unit 2020 performs product recognition with the respective partial images 14 as targets (S106). The display control unit 2040 displays, on the display apparatus 60, first displays 30 (S108). The first input reception unit 2060 receives input for selecting one or more first displays 30 (S110). The second input reception unit 2080 receives input of product identification information (S112). The third input reception unit 2100 receives input representing the selection ending operation (S114). The registration unit 2120 stores, in the storage apparatus 120, feature information of partial image(s) represented by the respective first display(s) 30 that has/have been selected before the selection ending operation is received in association with the input product identification information (S116).

The flow of operation performed by the information processing apparatus 2000 is not limited to the flow illustrated in FIG. 5. For example, product identification information may be input before the first display(s) 30 is/are selected, while the first display(s) 30 is/are selected, or after the selection ending operation has been received. That is, product identification information may be input at any timing at which the selection screen 40 in FIG. 2 is displayed or may be input in the registration screen 50. Note that it may be configured such that product identification information can be input in both the selection screen 40 and the registration screen 50 and product identification information that was input in the selection screen 40 can be corrected in the registration screen 50.

The information processing apparatus 2000 performs a series of processing illustrated in FIG. 5, triggered by various events. For example, it is configured such that, in response to the camera 10 having generated a captured image 12, the processing of product recognition and the like is performed with respect to the captured image 12 and the display control unit 2040 acquires a result of the processing and performs the processing in S102. From the viewpoint of a user of the information processing apparatus 2000, performing operation to make the camera 10 capture a captured image 12 causes first displays 30 to be displayed on the display apparatus 60.

Alternatively, for example, it may be configured such that input operation to specify a captured image 12 is received and the series of operation illustrated in FIG. 5 is performed with respect to the specified captured image 12. In this case, the information processing apparatus 2000 performs the series of processing illustrated in FIG. 5, triggered by having received the input operation from the user.

<Acquisition of Captured Image 12: S102>

The information processing apparatus 2000 acquires a captured image 12 (S102). For example, the information processing apparatus 2000 acquires a captured image 12 from a storage apparatus in which the captured image 12 is stored. The storage apparatus in which the captured image 12 is stored may be disposed inside the information processing apparatus 2000 or outside the information processing apparatus 2000. Alternatively, for example, the information processing apparatus 2000 acquires a captured image 12 that is input through input operation performed by a user. Still alternatively, for example, the information processing apparatus 2000 acquires a captured image 12 by receiving the captured image 12 transmitted by another apparatus.

The captured image 12 that the information processing apparatus 2000 acquires may be a captured image itself generated by the camera 10 or an image generated by applying some processing to a captured image generated by the camera 10. In the latter case, the captured image 12 is generated by, for example, performing trimming on the captured image generated by the camera 10 and thereby removing an unnecessary image region and/or applying color tone correction to the captured image generated by the camera 10.

<Object Detection: S104>

The recognition unit 2020 extracts partial images 14 each of which contains an object on the inside thereof from the captured image 12 by performing object detection on the captured image 12 (S104). As a technique of extracting a partial image supposed to contain an object on the inside thereof by performing object detection processing on an image, any existing technique can be used.

Figure 6:
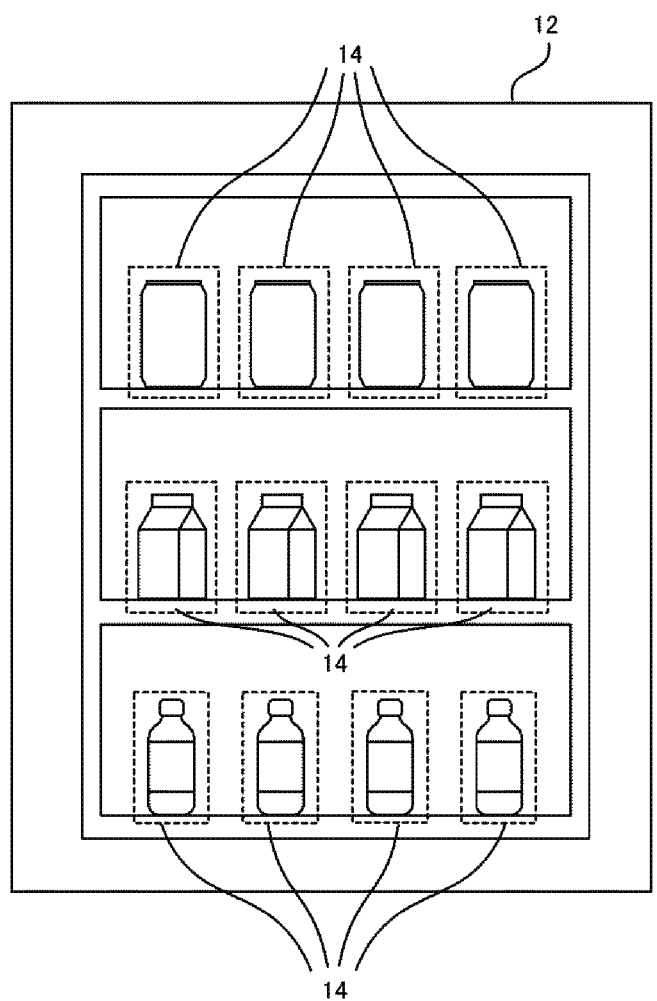
FIG. 6 is a diagram illustrating a captured image from which partial images are extracted.

FIG. 6 is a diagram illustrating a captured image 12 from which partial images 14 are extracted. In FIG. 6, displayed products are respectively detected as objects, and partial images 14 that respectively contain the objects are extracted. Note that FIG. 6 is a diagram for a description of a situation in which partial images 14 are extracted from the captured image 12 and it is not necessarily required to make the display apparatus 60 actually display such a situation.

<Product Recognition: S106>

The recognition unit 2020 performs, with respect to each partial image 14, determination of a product (product recognition) corresponding to an object contained in the partial image 14 (S106). The recognition unit 2020 classifies a partial image 14 where a product corresponding to an object contained therein was not able to be determined as a "partial image 14 where an object contained therein was not recognized as a product", which is to be displayed as a first display 30. As a technique of performing product recognition with respect to an object contained in each partial image extracted from an image, that is, a technique of determining what product an object in a partial image represents, any existing technique can be used.

<Display of First Display 30: S108>

The display control unit 2040 performs, with respect to a partial image 14 where an object contained therein was not recognized as a product among a plurality of partial images 14, display of a first display 30 on the display apparatus 60 (S108). The first display 30 may be configured to be any display that is capable of representing a corresponding partial image.

FIG. 7 is a diagram illustrating variations of a first display 30. In the upper row in FIG. 7, the first display 30 is a frame enclosing a corresponding partial image 14. The interior of the frame may be painted over with a predetermined color or pattern or does not have to be painted over.

In the lower row in FIG. 7, the first display 30 is a mark superimposed on a corresponding partial image 14. Note that the mark is not limited to a cross illustrated in FIG. 7 and may be any other mark, such as a circle.

Figure 8:
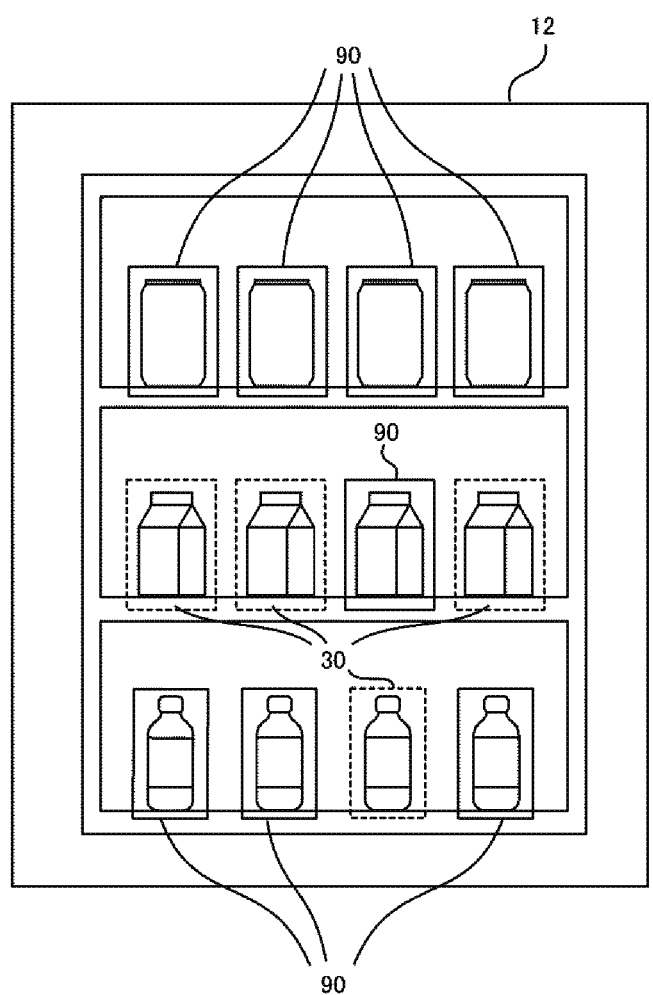
FIG. 8 is a diagram illustrating a case where, with respect to a partial image where an object contained therein was recognized as a product, a predetermined display is also displayed.

With respect to a partial image 14 where an object contained therein was recognized as a product, a display indicating the partial image 14 may also be displayed. FIG. 8 is a diagram illustrating a case where, with respect to a partial image 14 where an object contained therein was recognized as a product, a predetermined display is also displayed. In this diagram, partial images 14 where objects contained therein were recognized as products are represented by second displays 90. A second display 90 is assumed to be distinguishable from a first display 30. For example, in FIG. 8, first displays 30 are dotted-line frames, and second displays 90 are solid-line frames.

When the object detection and the product recognition are performed by an apparatus other than the information processing apparatus 2000, the display control unit 2040 acquires, from the apparatus, information specifying respective partial images 14 where objects contained therein were not recognized as products (locations, sizes, and the like of the partial images 14). When second displays 90 are also displayed, the display control unit 2040 also acquires information specifying respective partial images where objects contained therein were recognized as products.

<Selection of First Display 30: S110>

The first input reception unit 2060 receives input for selecting a first display 30 (S110). As a technique of receiving selection of a display on a display apparatus, any existing technique can be used. For example, the first input reception unit 2060 receives an operation of tapping a first display 30, an operation of clicking a first display 30, or the like as input operation for selecting the first display 30.

It is suitable that, through input operation for a first display 30, the shape of a partial image 14 corresponding to the first display 30 be configured to be able to be changed. For example, a portion (a shelf board or the like) of the display space 20 is sometimes included in a partial image 14 to a great extent. In this case, it is suitable that, by adjusting the shape of the partial image 14, the partial image 14 be configured not to include a shelf board or the like to a maximum extent.

FIG. 9 is a diagram illustrating operation of changing the shape of a partial image 14. In the example, it is assumed that the shape of the partial image 14 coincides with the shape of the first display 30. The user changes the shape of the partial image 14 by dragging an edge of the first display 30 and thereby changing the shape of the first display 30. In this processing, it is preferable that the operation of changing the shape of the first display 30 be initiated by an operation (operation of continuously tapping the first display 30 for a predetermined period or longer, or the like) distinguishable from operation of selecting the first display 30.

<Input of Product Identification Information: S112>

The second input reception unit 2080 receives input of product identification information (S112). The product identification information is any information for identifying a product. For example, the product identification information is an identification number, such as a Japanese Article Number (JAN) code, a product name, or the like.

As a method for receiving input of product identification information, various methods can be employed. Some of such methods will be exemplified below.

<<First Method>>

For example, the second input reception unit 2080 displays, on the display apparatus 60, possible pieces of product identification information and receives input for selecting a piece of product identification information out of the possible pieces of product identification information. It is suitable that the possible pieces of product identification information be displayed by use of an input interface (for example, a pull-down list) that displays a plurality of possible inputs in a list and receives selection of an input therefrom.

Various methods for determining possible pieces of product identification information that the display apparatus 60 is made to display are conceivable. For example, the second input reception unit 2080 receives input of a condition (a product name, a type of product, a maker, or the like) relating to a product and acquires product identification information of one or more products that conform to the condition by searching for product information (which will be described later), based on the input condition. The second input reception unit 2080 sets the one or more pieces of product identification information acquired in this processing as possible pieces of product identification information.

The afore-described product information indicates various types of information relating to a product. For example, the product information is stored in the storage apparatus 120. FIG. 10 is a diagram illustrating pieces of product information in a table form. The table illustrated in FIG. 10 is referred to as a table 200. The table 200 indicates product identification information 202, product names 204, prices 206, types 208, makers 210, and feature information 212. Each maker 210 indicates the name of a maker (a manufacturer, a seller, or the like) engaged in the manufacturing and sales of a product. Each piece of feature information 212 indicates one or more product images or image features. Each piece of feature information 212 in FIG. 10 indicates both a product image(s) and an image feature(s). When, as illustrated in FIG. 10, both a product image and an image feature are indicated in a piece of feature information 212, the product image and the image feature extracted from the product image are configured to be stored in advance in association with each other.

When information that can be used for narrowing down products included in the captured image 12 is obtained in advance, product information may be searched for, using the information as a condition. For example, before and after the user captures an image of the display space 20 by use of the camera 10, information about the display space 20 is configured to be input. More specifically, information of the types, names, and the like of products displayed in the display space 20 is configured to be input to the information processing apparatus 2000. In this case, the second input reception unit 2080 obtains possible pieces of product identification information by searching a product database, using the information as a condition.

<<Second Method>>

The second input reception unit 2080 may, for example, receive as input of product identification information selection of a display (a second display 90) representing a partial image 14 where an object contained therein was recognized as a product. That is, the second input reception unit 2080 receives as input the product identification information of a product contained in the partial image 14 corresponding to the selected second display 90. In this case, the display control unit 2040 displays, on the display apparatus 60, not only a first display 30 but also a second display 90.

Figure 11:
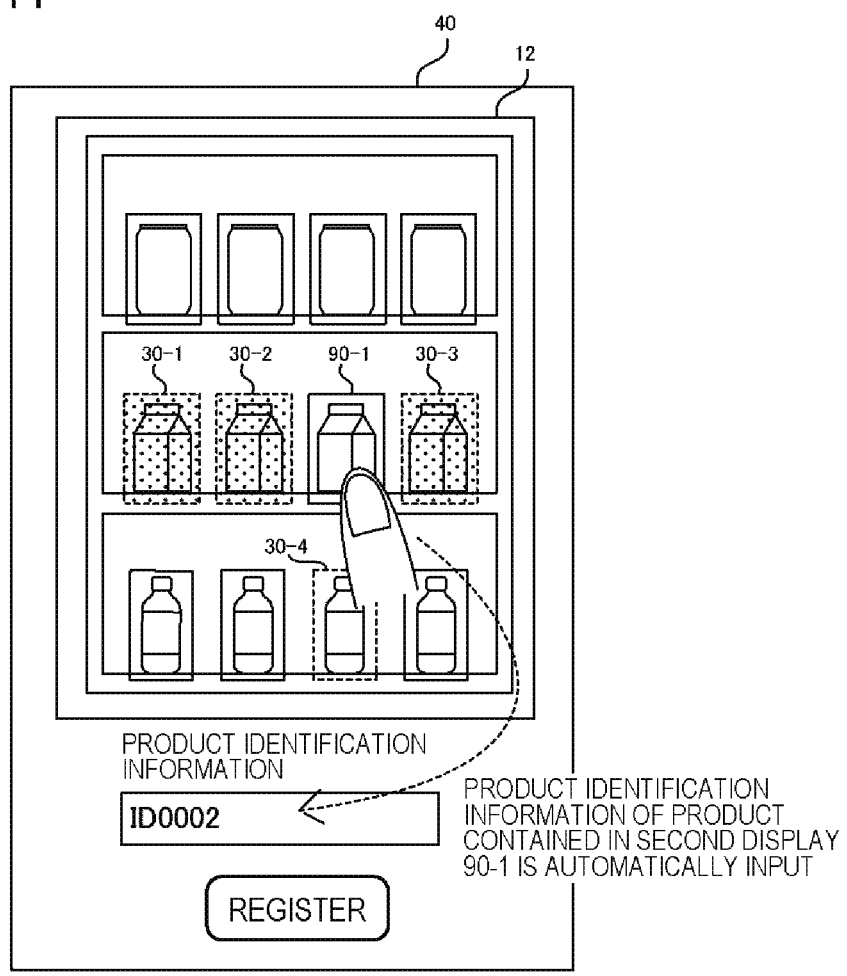
FIG. 11 is a diagram illustrating a case where product identification information is input by selecting a second display.

FIG. 11 is a diagram illustrating a case where product identification information is input by selecting a second display 90. In the diagram, a second display 90-1 is selected. The second display 90-1 corresponds to a partial image 14 from within which a product having a product identifier ID0002 is recognized. Thus, the second input reception unit 2080 receives input of product identification information ID0002.

Note that, in FIG. 11, selection of the first display 30-1, the first display 30-2, and the first display 30-3 is also performed. Therefore, through the above-described input operation, ID0002 can be specified as the product identification information of objects that are respectively contained in the three first displays 30.

In the case where product identification information is input by selecting a second display 90 as described above, in a situation in which a plurality of identical products are displayed side by side (the number of faces is equal to or greater than two), only some of the products are recognized as products. For example, in FIG. 12, all the products contained in the first display 30-1, the first display 30-2, the first display 30-3, and the second display 90-1 are the same products. In such a case, enabling product identification information to be input through selection of a second display 90 enables the product identification information of an unrecognized product to be easily specified through selection of a recognized product. Thus, the user becomes able to easily input product identification information.

Note that, when, as in the example in FIG. 11, product identification information can also be input in the selection screen 40, in which selection of a first display 30 is performed, the registration screen 50 (see FIG. 2) does not have to be provided separately. In this case, in response to performance of the selection ending operation (in FIG. 11, pressing a registration button) in the selection screen 40, the registration unit 2120 stores, in the storage apparatus 120, feature information based on a partial image 14 corresponding to a selected first display 30 in association with the product identification information of a product contained in a partial image 14 corresponding to a selected second display 90.

<<Third Method>>

Alternatively, for example, the first input reception unit 2060 may receive operation of reading product identification information from a product. For example, it is configured such that, by reading a bar-code provided to a product with a bar-code reader, the product identification information of the product can be input. Note that codes and the like usable for the reading is not limited to a bar-code and various types of symbols, such as a QR code (registered trademark), can be used.

When the user uses the information processing apparatus 2000 while capturing an image of a display space with the camera 10, it can be said that a product having product identification information that the user desires to input (a product that was not recognized despite the captured image 12 having been analyzed) is often present in the vicinity of the user. Therefore, enabling product identification information to be input through reading the product identification information from a product enables the convenience of the information processing apparatus 2000 to be improved.

Note that the reader of a bar-code or a QR code (registered trademark) may be achieved as a dedicated apparatus or achieved by use of the camera 10. When the information processing apparatus 2000 is, for example, achieved as a mobile terminal and the camera 10 is a camera that is mounted on the mobile terminal, it is configured such that, by capturing an image of a bar-code or the like provided to a product with the camera 10, product identification information can be obtained from the bar-code or the like. Note that, as a technique of reading identification information from an image of a bar-code or a QR code (registered trademark), any existing technique can be used.

<Selection Ending Operation: S114>

The third input reception unit 2100 receives selection ending operation (S114). The selection ending operation can be configured to be any operation that is distinguishable from the operation of selecting a first display 30 and the operation of inputting product identification information. For example, it is configured such that a button "selection end" is displayed on the display apparatus 60 and input operation to the button is received as the selection ending operation (see FIG. 2).

Figure 12:
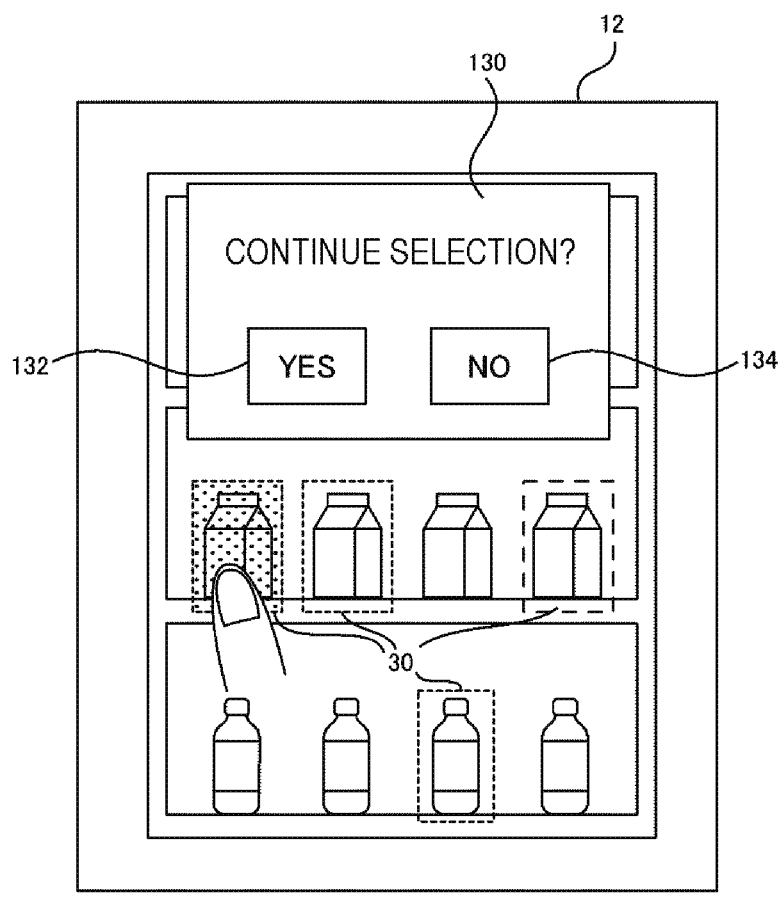
FIG. 12 is a diagram illustrating input operation for selecting whether to continue selection of a first display.

Alternatively, for example, every time one first display 30 is selected, the third input reception unit 2100 may receive input operation for selecting whether to continue selection of a first display 30. FIG. 12 is a diagram illustrating input operation for selecting whether to continue selection of a first display 30. In FIG. 12, in response to a first display 30 being selected, a pop-up window 130 is displayed. In the pop-up window 130, a button 132 and a button 134 are included. When the button 132 is pressed, the information processing apparatus 2000 closes the pop-up window 130 and further receives operation for selecting a first display 30. On the other hand, when the button 134 is pressed, the information processing apparatus 2000 makes the display apparatus 60 display the registration screen 50. That is, in the example, the operation of pressing the button 134 serves as the selection ending operation.

<Registration Processing: S116>

The registration unit 2120 stores, in the storage apparatus 120, feature information based on partial images 14 respectively corresponding to one or more first displays 30 that have been selected before the selection ending operation is received in association with product identification information that the second input reception unit 2080 has received (S116).

As described afore, feature information is a product image or an image feature extracted from the product image. Thus, the registration unit 2120 treats both or either of a partial image 14 (equivalent to a product image) and an image feature extracted from the partial image 14 as feature information based on the partial image 14.

For example, the storage apparatus 120 stores the afore-described product information as information associating product identification information with feature information. In this case, the registration unit 2120 adds feature information of a partial image 14 corresponding to each selected first display 30 to product information having product identification information that the second input reception unit 2080 has received. Note, however, that, when there exists no product information having product identification information that the second input reception unit 2080 has received, the registration unit 2120 generates new product information having the product identification information. The registration unit 2120 adds feature information of a partial image 14 corresponding to each selected first display 30 to the newly generated product information.

The target to which the registration unit 2120 adds feature information does not necessarily have to be the afore-described product information. For example, the registration unit 2120 stores, in the storage apparatus 120, feature information based on a partial image 14 as possible feature information to be added to product information. For example, as a generation policy of the product information, a policy stating that, "to product information, only information permitted by the administrator can be added" is conceivable. In such a case, feature information stored in the storage apparatus 120 by the registration unit 2120 is added to product information after the feature information has been permitted in a check by an administrator.

Note that, when an image feature extracted from a partial image 14 is used as feature information, an image feature extracted in a process of object detection processing on the captured image 12 can be used as the image feature. When the object detection on the captured image 12 is performed by an apparatus other than the information processing apparatus 2000, the registration unit 2120 acquires image features extracted from respective partial images 14 from the apparatus.

Note, however, that the registration unit 2120 may stores, in the storage apparatus 120, an extracted image feature by, instead of using an image feature extracted in the process of object detection, separately performing processing of extracting an image feature from a partial image 14. When a selected partial image 14 is a partial image the shape of which has been changed by user operation, the partial image 14 has become a partial image different from a partial image when the object detection was performed. Therefore, it is suitable that the registration unit 2120 perform extraction of an image feature with respect to the partial image 14 again.

<Use of Feature Information Stored in Storage Apparatus 120>

Feature information that the storage apparatus 120 is made to store in association with product identification information can be used in product recognition to be performed subsequently. That is, feature information can be used for performing recognition of a product from a captured image 12 to be obtained in the future.

As described afore, in order to enable recognition of a product the feature of the appearance of which greatly differs depending on the viewing direction from a captured image with high precision, feature information of the product when viewed from various directions is required. Being unable to recognize a product included in the captured image 12 by means of the product recognition means that variations of the feature information of the product are insufficient.

In such a situation in which variations of the feature information of a product are insufficient, use of the information processing apparatus 2000 enables the variations of the feature information of the product to be easily increased by adding feature information based on a partial image 14 that is an image of the product.

Second Example Embodiment

Figure 13:
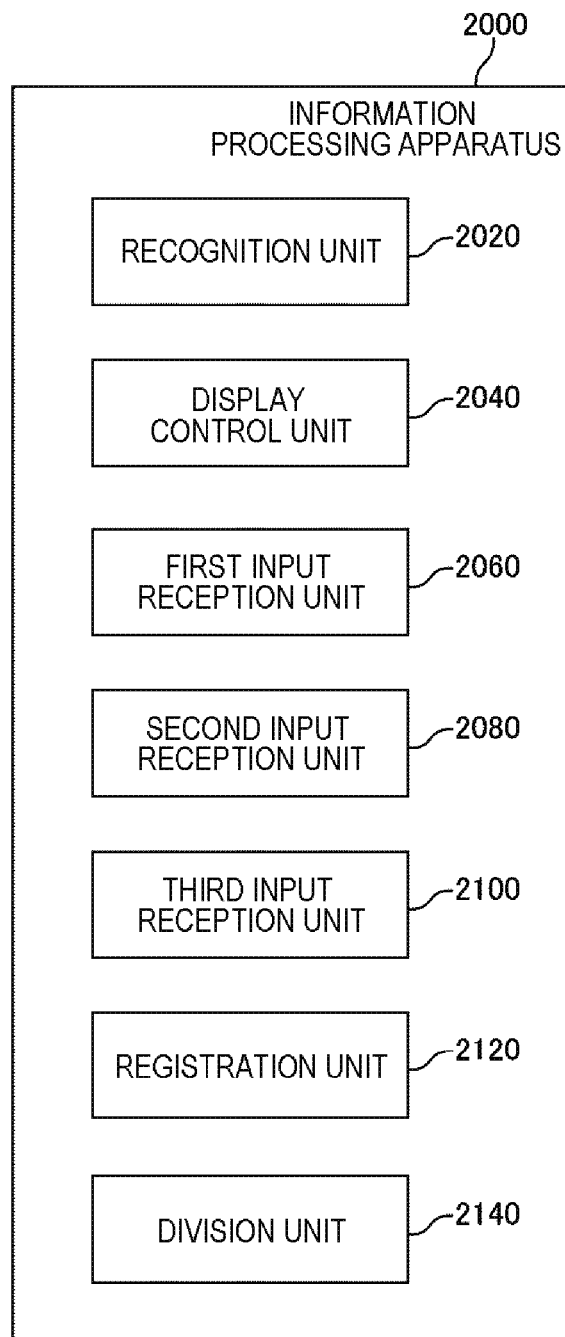
FIG. 13 is a block diagram illustrating a functional configuration of an information processing apparatus of a second example embodiment.

FIG. 13 is a block diagram illustrating a functional configuration of an information processing apparatus 2000 of a second example embodiment. With the exception of a point that will be described below, the information processing apparatus 2000 of the second example embodiment has the same functions as those of the information processing apparatus 2000 of the first example embodiment.

The information processing apparatus 2000 of the second example embodiment has a function of dealing with a case where, "in one partial image 14 where an object contained therein was not recognized as a product, a plurality of products are contained". In such a case, it is suitable that the partial image 14 be divided in such a way that only one product is contained in one partial image 14 and respective images after the division be newly treated as partial images 14.

Figure 14:
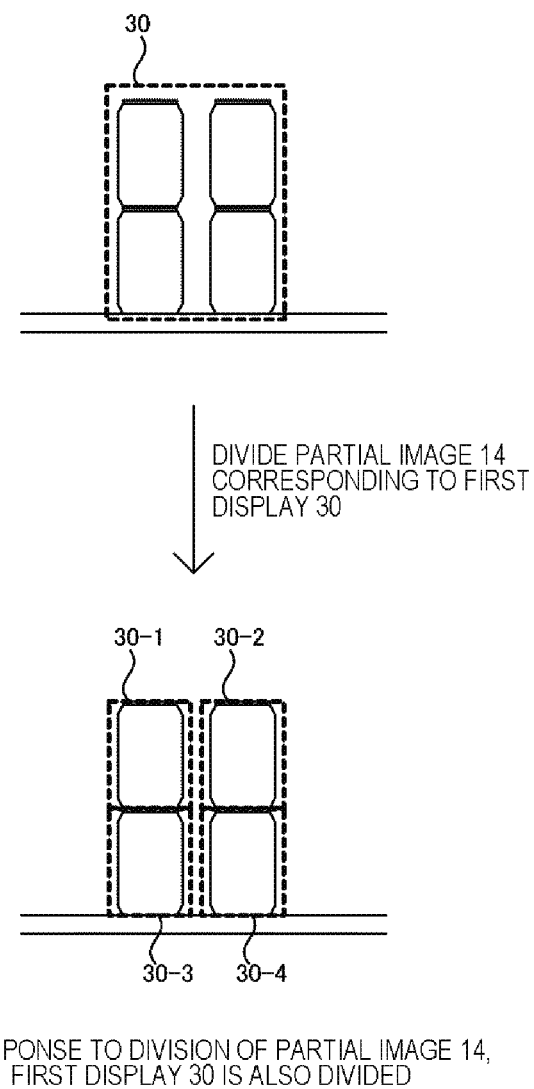
FIG. 14 is a diagram illustrating a case where a plurality of products are contained in a partial image.

FIG. 14 is a diagram illustrating a case where a plurality of products are contained in a partial image 14. In the upper row in FIG. 14, four products are contained in a first display 30. In the lower row in FIG. 14, dividing the partial image 14 in the upper row in FIG. 14 into four images causes partial images 14-1 to 14-4 to be generated, and a first display 30 is displayed with respect to each of the four partial images 14.

For this reason, the information processing apparatus 2000 of the second example embodiment includes a division unit 2140. The division unit 2140 divides a partial image 14 represented by a first display 30 into a plurality of partial images 14. The information processing apparatus 2000 of the second example embodiment also displays a first display 30 with respect to each of the partial images 14 that are newly generated by the division. Note that the first display 30 having been displayed with respect to the partial image 14 before the division is deleted from a display apparatus 60.

Advantageous Effects

When objects are detected from a captured image by means of image analysis, a plurality of objects adjacent to one another are sometimes erroneously detected as one object due to influence of noise and the like. As a result, a plurality of objects are unexpectedly contained in one partial image 14. When such a partial image 14 has to be associated with one product, it is impossible to make the storage apparatus 120 store an appropriate image representing the product.

In this respect, according to the information processing apparatus 2000 of the present example embodiment, when a plurality of objects are contained in one partial image 14, dividing the partial image 14 enables only one object to be contained in one partial image 14. Thus, it becomes possible to easily make the storage apparatus 120 store an image representing a product appropriately.

There are various methods as a method by which the division unit 2140 divides a partial image 14. Specific examples of the method will be described below.

<<First Division Method>>

For example, the division unit 2140 receives input operation to specify a division number by which a partial image 14 is divided and equally divides a selected first display 30 by the received division number. For example, FIG. 15 is a diagram illustrating a case of receiving input of division numbers. In FIG. 15, the first display 30 is selected. In the first display 30, products, three in the horizontal direction and two in the vertical direction, are contained. Thus, the user performs, to an input area 140 included in a selection screen 40, inputs expressed as "horizontal: 3 pieces" and "vertical: 2 pieces". The user subsequently presses a button labeled as "perform division". As a result, the division unit 2140 trisects in the horizontal direction and bisects in the vertical direction a partial image 14 corresponding to the first display 30.

The method for selecting a partial image 14 to be divided may be the same method as or a different method from a method in which a first input reception unit 2060 receives selection of a first display 30. In the former case, for example, when the division unit 2140 receives an instruction of division (for example, pressing of the afore-described button labeled as "perform division") while only one first display 30 is selected, the division unit 2140 divides the first display 30.

When a selection operation of a mode different from the selection operation that the first input reception unit 2060 receives is to be received, it is configured such that, for example, the first input reception unit 2060 receives a single tap on a first display 30 and the division unit 2140 receives a double tap on the first display 30.

<<Second Division Method>>

The division unit 2140 may, for example, divide a partial image 14, based on the size of a partial image 14 where an object contained therein was recognized as a product. For example, the division unit 2140 determines a reference size, based on the size of a partial image 14 where an object contained therein was recognized as a product. The division unit 2140 determines, from a ratio between the size of a partial image 14 represented by a selected first display 30 and the reference size, respective division numbers in the horizontal direction and the vertical direction of the partial image 14. The division unit 2140 divides the partial image 14 by the determined division numbers.

Figure 16:
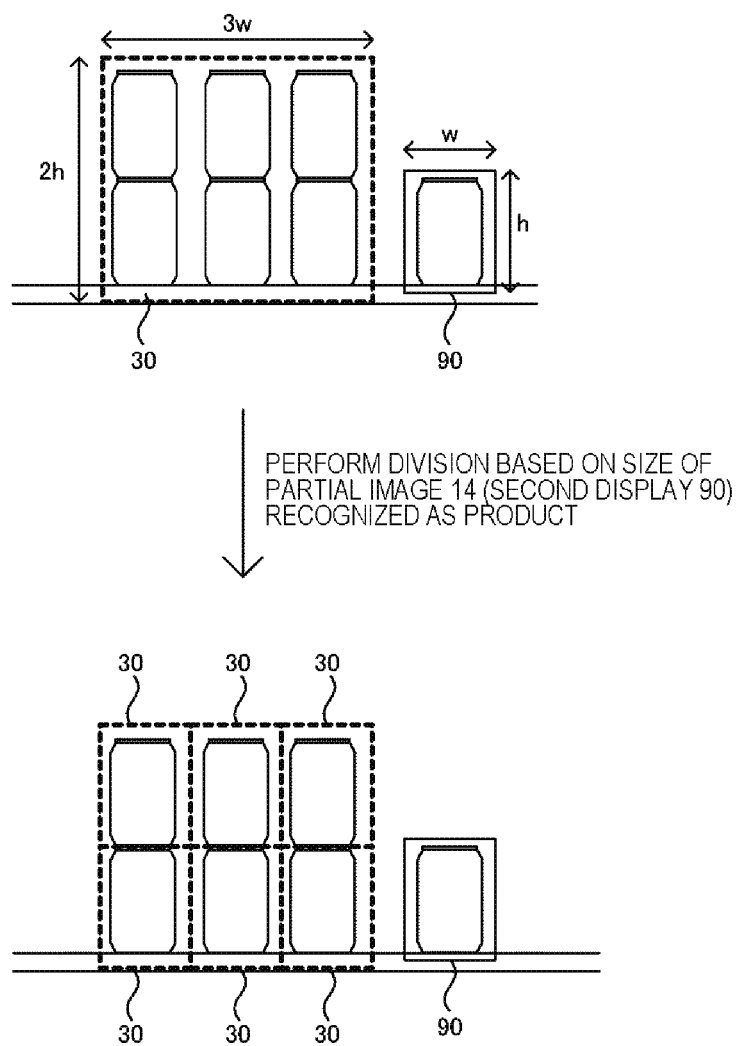
FIG. 16 is a diagram illustrating a case of dividing a partial image, based on a reference size.

FIG. 16 is a diagram illustrating a case of dividing a partial image 14, based on a reference size. In FIG. 16, the size of a partial image 14-1 where an object contained therein was recognized as a product is h in the vertical direction and w in the horizontal direction. Thus, a combination of h in the vertical direction and w in the horizontal direction is set as a reference size.

The size of a partial image 14-2 to be divided is 2h in the vertical direction and 3w in the horizontal direction. Thus, the division unit 2140 divides the partial image 14-2 with the division number in the vertical direction set at 2 and the division number in the horizontal direction set at 3.

There are various methods for determining a reference size. For example, the division unit 2140 determines, as a reference size, the size of a partial image 14 that is a partial image 14 adjacent to a partial image 14 represented by a selected first display 30 and where an object contained therein was recognized as a product. When a plurality of partial images 14 as described above are present, the division unit 2140, for example, determines, as a reference size, statistics (an average or the like) of the sizes of the plurality of partial images 14. Alternatively, for example, the division unit 2140 may determine, as a reference size, statistics of the sizes of all partial images 14 where objects contained therein were recognized as products.

Note that, in FIG. 16, in order to simplify the description, the width and the height of the first display 30 are multiples of the width and the height of the reference size, respectively. However, the width and the height of a first display 30 are not necessarily multiples of the width and the height of the reference size. Thus, for example, the division unit 2140 determines an approximate value (a rounded-down value, a rounded-up value, or a rounded-off value) of a value obtained by dividing the width of the first display 30 by the width of the reference size as the division number in the horizontal direction. Similarly, the division unit 2140 determines an approximate value of a value obtained by dividing the height of the first display 30 by the height of the reference size as the division number in the height direction.

It is suitable that the division number determined by the division unit 2140 be configured to be changeable by user operation. For example, the division unit 2140 is configured to set, as an initial value, the division number determined from a reference size into the above-described input area 140 illustrated in FIG. 15.

<On Partial image 14 Not Containing Product>

There may exist a partial image 14 in which no product is contained. It may be configured such that a first display 30 indicating such a partial image 14 can be deleted by user operation. As a technique of receiving user operation instructing deletion of a display on a screen and delete the display in response to the instruction, any existing technique can be used.

Note that examples of the case where no product is contained in a partial image 14 include, for example, a case where a price tag is falsely detected as an object. Alternatively, for example, when a partial image 14 in which a plurality of products are contained is divided into partial images with respect to each product, there may occur a case where a partial image 14 in which no product is contained is generated.

Figure 17:
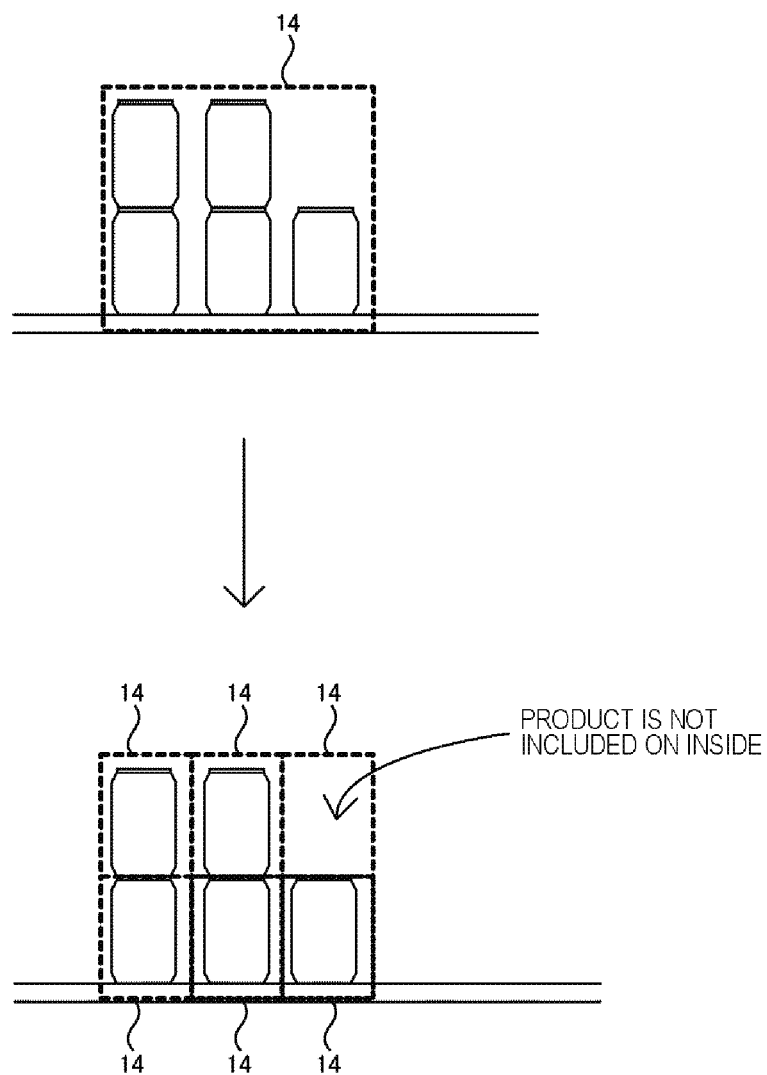
FIG. 17 is a diagram illustrating a case where a partial image in which no product is contained is generated through division performed by a division unit.

FIG. 17 is a diagram illustrating a case where a partial image 14 in which no product is contained is generated through division performed by the division unit 2140. In FIG. 17, a partial image 14 before the division has a width equivalent to three products and a height equivalent to two products. Note, however, that no product is contained in an upper right portion of the partial image 14 and the number of products contained in the partial image 14 is five. In such a case, when the partial image 14 is divided according to the size of the product, a partial image 14 in which no product is contained may be generated.

Example of Hardware Configuration

A hardware configuration of a computer that achieves the information processing apparatus 2000 of the second example embodiment is, as with the first example embodiment, illustrated by, for example, FIG. 4. Note, however, that, in a storage device 1080 in a computer 1000 that achieves the information processing apparatus 2000 of the present example embodiment, program modules that achieve the functions of the information processing apparatus 2000 of the present example embodiment are further stored.

Third Example Embodiment

With the exception of a point that will be described below, an information processing apparatus 2000 of a third example embodiment has the same functions as those of the information processing apparatus 2000 of the first example embodiment or the information processing apparatus 2000 of the second example embodiment.

When a plurality of first displays 30 are selected, the information processing apparatus 2000 of the third example embodiment makes a storage apparatus 120 store only feature information of a partial image 14 satisfying a predetermined condition out of partial images 14 respectively represented by the first displays 30. That is, a registration unit 2120 of the third example embodiment determines whether each partial image 14 represented by each of the first displays 30 satisfies a predetermined condition and, when the partial image 14 satisfies the predetermined condition, makes the storage apparatus 120 store feature information of the partial image 14.

As the above-described predetermined condition, various conditions can be employed. Specific examples of the predetermined condition will be described below.

<First Predetermined Condition: Number of Feature Points>

As described afore, as a use method of partial images 14 stored in association with product identification information, there is a method of using a partial image 14 to recognize a product determined by the product identification information from a captured image. As a method for the product recognition, there is a method of matching local feature amounts (image features) obtained for respective feature points (corners, edges, blobs, and the like) of an object detected from a captured image with local feature amounts obtained for respective feature points of an object contained in a partial image 14. In order to perform the matching with high precision, a sufficient number of feature points are required to be obtained with respect to an object contained in a partial image 14. In other words, a partial image 14 from which a sufficient number of feature points cannot be obtained with respect to an object contained therein is difficult to use for the product recognition.

Thus, the registration unit 2120 determines whether the number of feature points obtained with respect to an object contained in each partial image 14 represented by each of the selected first displays 30 is equal to or greater than a predetermined value. When the number of feature points is determined to be equal to or greater than the predetermined value, the registration unit 2120 stores, in the storage apparatus 120, feature information of the partial image 14. In contrast, when the number of feature points is determined to be less than the predetermined value, the registration unit 2120 does not make the storage apparatus 120 store feature information of the partial image 14.

Note that the above-described predetermined value may be a value that is common to all products or a value that is different depending on a product. For example, the predetermined value is defined for each product type in advance. The registration unit 2120 determines, with respect to a product determined by product identification information that a second input reception unit 2080 has received, the type of the product and acquires and uses a predetermined value defined for the type.

<Second Predetermined Condition: Degree of Similarity to Already Stored Feature Information>

There may exist a case where, in the storage apparatus 120, feature information has already been stored with respect to product identification information that the second input reception unit 2080 has received. In this case, feature information having a high degree of similarity to the feature information that has already been stored can be said to have a low degree of importance at least from the viewpoint of increasing variations of feature information that the storage apparatus 120 is made to store.

Thus, the registration unit 2120 computes a degree of similarity between feature information stored in the storage apparatus 120 in association with product identification information that the second input reception unit 2080 has received and feature information of each partial image 14 represented by each of the selected first displays 30 and determines whether the computed degree of similarity is equal to or less than a predetermined threshold value. When the computed degree of similarity is equal to or less than the predetermined threshold value, the registration unit 2120 stores, in the storage apparatus 120, the feature information of the partial image 14. In contrast, when the computed degree of similarity is greater than the predetermined threshold value, the registration unit 2120 does not make the storage apparatus 120 store the feature information of the partial image 14.

As a technique of computing a degree of similarity of feature information (a degree of similarity between product images or a degree of similarity between image features extracted from product images), any existing technique can be used.

<Third Predetermined Condition: Degree of Similarity Among Image Features of a Plurality of Partial Images 14>

When a plurality of first displays 30 are selected, there is a possibility that feature information of a partial image 14 represented by a first display 30 is similar to feature information of a partial image 14 represented by another first display 30. Regarding such pieces of feature information similar to one another, it can be said that it is only necessary to make the storage apparatus 120 store some (for example, one) of the pieces of feature information at least from the viewpoint of increasing variations of feature information that the storage apparatus 120 is made to store.

Thus, the registration unit 2120 attempts to determine, out of pieces of feature information of partial images 14 represented by a plurality of selected first displays 30, a combination of pieces of feature information the degree of similarity of which is equal to or greater than a predetermined threshold value. When such a combination is determined, the registration unit 2120 stores, in the storage apparatus 120, with respect to pieces of feature information included in the combination, only some (for example, only one) of the pieces of feature information. As a technique of finding, out of a plurality of piece of information, a combination of pieces of information the degree of similarity of which is high, any existing technique can be used.

Example of Hardware Configuration

A hardware configuration of a computer that achieves the information processing apparatus 2000 of the third example embodiment is, as with the first example embodiment, illustrated by, for example, FIG. 4. Note, however, that, in a storage device 1080 in a computer 1000 that achieves the information processing apparatus 2000 of the present example embodiment, program modules that implement the functions of the information processing apparatus 2000 of the present example embodiment are further stored.

Fourth Example Embodiment

An information processing apparatus 2000 of a fourth example embodiment deletes feature information stored in association with product identification information in product information from a storage apparatus 120 under a predetermined condition. Conceptually, the information processing apparatus 2000 deletes feature information having low usability at the time of being used in product recognition.

The above feature information may be feature information that the storage apparatus 120 is made to store by a registration unit 2120 or feature information that the storage apparatus 120 is made to store by means of a method other than the above. The "method other than the above" means a method of not using the information processing apparatus 2000. For example, when product information is managed by a database server, it is conceivable to add feature information to the product information, directly using software managing the database server.

Advantageous Effects

It is preferable that a plurality of pieces, instead of only one piece, of feature information be associated with product identification information. This is because preparing feature information with respect to each of appearances of a product when viewed from various directions enables the product to be recognized in whatever direction the product faces when displayed. That is, increasing variations of feature information associated with product identification information enables the precision of product recognition to be improved.

On the other hand, increasing the number of pieces of feature information causes the amount of storage area used to increase or the management of feature information to become complicated. Therefore, it is preferable that features having high usability be associated with product identification information.

According to the information processing apparatus 2000 of the present example embodiment, feature information having low usability at the time of being used in product recognition is deleted from the storage apparatus 120. Therefore, it is possible to, while preventing the precision of product recognition using feature information from greatly decreasing, reduce the amount of feature information that the storage apparatus 120 is made to store.

Example of Functional Configuration

Figure 18:
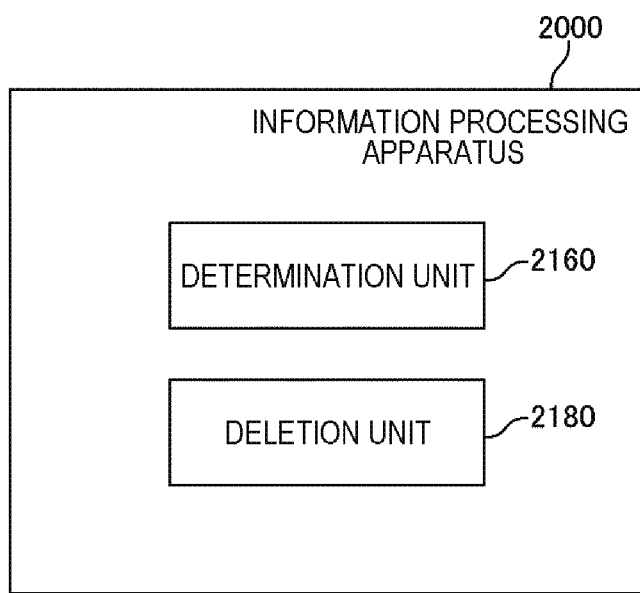
FIG. 18 is a diagram illustrating a functional configuration of an information processing apparatus of a fourth example embodiment.

FIG. 18 is a diagram illustrating a functional configuration of the information processing apparatus 2000 of the fourth example embodiment. The information processing apparatus 2000 of the fourth example embodiment includes a determination unit 2160 and a deletion unit 2180. The determination unit 2160 determines whether feature information to be determined satisfies a predetermined condition. When feature information to be determined is determined to satisfy the predetermined condition, the deletion unit 2180 deletes the feature information to be determined from the storage apparatus 120.

Example of Hardware Configuration

A hardware configuration of a computer that achieves the information processing apparatus 2000 of the fourth example embodiment is, as with the first example embodiment, illustrated by, for example, FIG. 4. Note, however, that, in a storage device 1080 in a computer 1000 that achieves the information processing apparatus 2000 of the present example embodiment, program modules that implement the functions of the information processing apparatus 2000 of the present example embodiment are stored.

<Processing Flow>

Figure 19:
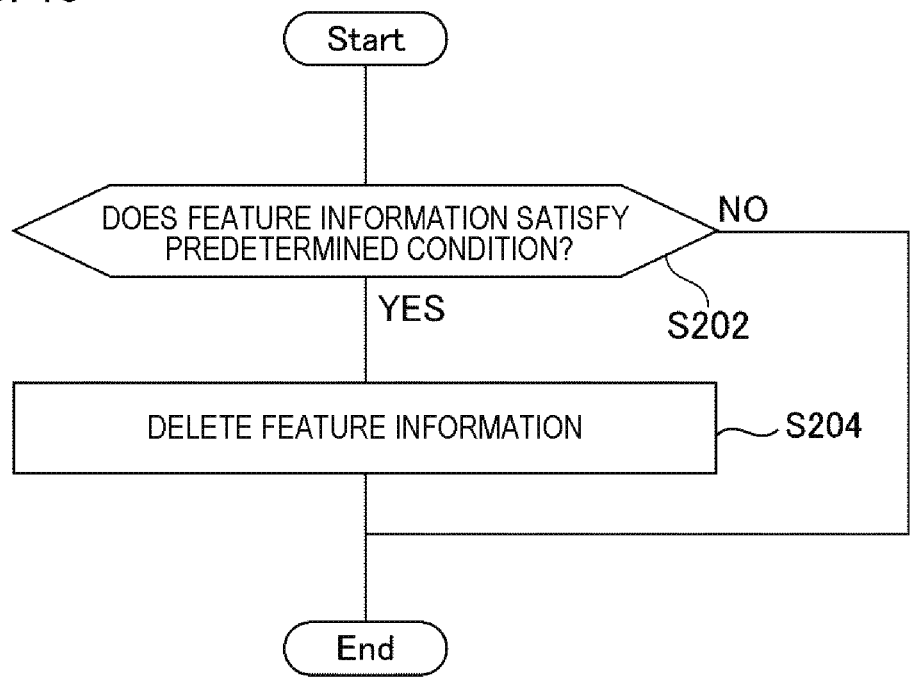
FIG. 19 is a flowchart illustrating a processing flow that is performed by the information processing apparatus of the fourth example embodiment.

FIG. 19 is a flowchart illustrating a processing flow that is performed by the information processing apparatus 2000 of the fourth example embodiment. The determination unit 2160 determines whether feature information to be determined satisfies a predetermined condition (S202). When the feature information to be determined is determined to satisfy the predetermined condition (S202: YES), the deletion unit 2180 deletes the feature information to be determined from the storage apparatus 120 (S204). When the feature information to be determined is determined not to satisfy the predetermined condition (S202: NO), the processing in FIG. 19 terminates.

<Timing when Information Processing Apparatus 2000 Operates>

Timings when the information processing apparatus 2000 operates (that is, timings when the information processing apparatus 2000 attempts deletion of feature information) are various. For example, the information processing apparatus 2000 operates periodically (for example, once a week or a month). Alternatively, for example, the information processing apparatus 2000 operates in response to feature information being added to product information. Still alternatively, for example, the information processing apparatus 2000 operates in response to receiving predetermined input operation from a user.

<Method for Determining Feature Information to be Determined>

The determination unit 2160 may set as a target for determination all pieces of feature information stored in the storage apparatus 120 or some of the pieces of feature information. In the latter case, the determination unit 2160, for example, determines product identification information which is associated with a new piece of feature information that has been added since the previous determination was performed and sets as a target for determination respective pieces of feature information associated with the product identification information. This is because, when feature information is newly associated with product identification information, there is a possibility that the newly associated feature information is not useful or the usability of feature information that has been associated with the product identification information in the past decreases.

<Determination by Determination Unit 2160: S202>

The determination unit 2160 determines whether feature information to be determined satisfies a predetermined condition (S202). As the predetermined condition, various types of conditions can be employed. Variations of the predetermined condition will be described below.

<<First Predetermined Condition: Number of Feature Points>>

Since a product image from which a sufficient number of feature points cannot be obtained with respect to an object contained therein or an image feature obtained from such a product image are difficult to use for product recognition, the usability of such a product image or image feature at the time of being used for product recognition can be said to be low. Thus, the deletion unit 2180 sets as a target for deletion feature information in which the number of feature points (feature points detected from a product image or feature points that an image feature indicates) included in the feature information is equal to or less than a predetermined value. That is, a condition requiring that "the number of feature points included in the feature information be equal to or less than a predetermined value" is set as a predetermined condition. This configuration enables feature information that is difficult to use for product recognition, that is, feature information the usability of which at the time of being used for product recognition is low, to be deleted from the storage apparatus 120.

Note that the above-described predetermined value may be a value that is common to all products or a value that is different depending on a product. For example, the predetermined value is defined for each product type in advance. The determination unit 2160 determines, with respect to a product determined by product identification information that is associated with feature information to be determined, the type of the product and acquires and uses a predetermined value defined for the type.

<<Second Predetermined Condition>>

The deletion unit 2180, for example, sets as a target for deletion feature information that is less likely to be, in the product recognition, determined to have a high degree of similarity (for example, equal to or greater than a predetermined value) to feature information obtained from an object to be recognized. In the product recognition, when feature information of an object to be recognized is determined to have a high degree of similarity to certain feature information included in product information, the object is recognized as a product having product identification information associated with the certain feature information. Therefore, feature information that is frequently determined to have a high degree of similarity to feature information of an object to be recognized can be said to well represent features of the appearance of the product. To put it the other way around, it is highly probable that feature information that is less likely to be determined to have a high degree of similarity to feature information of an object to be recognized does not well represent features of the appearance of the product. Thus, the deletion unit 2180 sets as a target for deletion such feature information that does not well represent features of the appearance of a product. That is, a condition requiring that, "in the product recognition, it be less likely to be determined that the product image and an image of an object to be recognized have a high degree of similarity to each other" is set as the above-described predetermined condition.

The condition requiring that, "in the product recognition, it be less likely to be determined that the product image and an image of an object to be recognized have a high degree of similarity to each other" can be restated into a more specific condition relating to a period or frequency, such as a condition requiring that "the feature information have not been determined to have a high degree of similarity to feature information of an object to be recognized for a predetermined period or longer" and a condition requiring that "frequency at which it is determined that the feature information and feature information of an object to be recognized have a high degree of similarity to each other be equal to or less than a predetermined value".

A product that is not stocked in a store temporarily (for example, for a month) due to short supply or the like is not set as a target for product recognition for the period. Feature information that satisfies the above-described condition because of such a cause may have a possibility of well representing features of the appearance of the product.

Thus, the case where feature information is set as a target for deletion, based on the above-described condition may be limited to a case where a product having product identification information associated with the feature information has been recognized by use of other feature information. Specifically, a condition requiring that "the feature information and feature information of an image of an object to be recognized have not been determined to have a high degree of similarity to each other for a predetermined period or longer" and, "during the predetermined period, a product having product identification information associated with the feature information have been recognized as a product a predetermined number of times or more" is set as the predetermined condition. Similarly, a condition requiring that "frequency at which the feature information and feature information of an object to be recognized are determined to have a high degree of similarity to each other be equal to or less than a first predetermined value" and "a product having product identification information associated with the feature information have been recognized as a product at a frequency equal to or greater than a second predetermined value" may be set as the predetermined condition. Note that it is assumed that the first predetermined value and the second predetermined value satisfy a relationship expressed as "the first predetermined value<the second predetermined value".

<<Third Predetermined Condition>>

The deletion unit 2180, for example, sets as a target for deletion, out of a plurality of pieces of feature information associated with the same product identification information, some pieces of feature information that are similar to one another. That is, a condition requiring "having a high degree of similarity to other feature information associated with the same product identification information" is set as the predetermined condition. This is because, regarding pieces of feature information that have a high degree of similarity to one another, only including some (for example, one) of the pieces of feature information in product information enables a product having features represented by the pieces of feature information to be recognized.

Specifically, the determination unit 2160 attempts to determine, out of a plurality of pieces of feature information associated with the same product identification information, a combination of pieces of feature information the degree of similarity of which is equal to or greater than a predetermined threshold value. When such a combination is determined, the determination unit 2160 determines that respective pieces of feature information included in the combination satisfy the predetermined condition. Note that, as a technique of finding, out of a plurality of piece of information, a combination of pieces of information the degree of similarity of which is high, any existing technique can be used.

Regarding a plurality of pieces of feature information included in the above-described combination, it is necessary that some (for example, one) of the pieces of feature information, instead of being deleted, are left in the product information. There are various methods for determining feature information not to be deleted. For example, the deletion unit 2180 excludes, among a plurality of pieces of feature information, a piece of feature information that, in product recognition, has been determined most often to have a high degree of similarity to feature information of an object to be recognized from pieces of feature information to be deleted. This is because such feature information is highly probable to best represent the feature of a product. Alternatively, for example, the deletion unit 2180 may exclude a piece of feature information selected at random out of the above-described combination from pieces of feature information to be deleted or exclude a piece of feature information that was added to the product information at the earliest date and time from pieces of feature information to be deleted.

<Other Conditions>

When the number of pieces of feature information associated with product identification information is small, it can be said that necessity to delete feature information is low. Thus, the determination unit 2160 may add a condition requiring that "the total number of pieces of feature information associated with product identification information that is associated with feature information to be determined be equal to or greater than a predetermined value" to the above-described respective predetermined conditions.

While the example embodiments of the present invention have been described above with reference to the drawings, the example embodiments are only exemplification of the present invention, and a combination of the above-described example embodiments or various configurations other than the above-described example embodiments can also be employed.

For example, in the afore-mentioned description, the display apparatus 60 was made to display a captured image 12 on which first displays 30 are superimposed. However, when a display apparatus, such as a transmission-type head-mounted display, that enables an image and a scene in the real world to be seen in a superimposed manner is used as the display apparatus 60, the captured image 12 does not have to be displayed on the display apparatus 60. In this case, the display control unit 2040 determines, based on a correspondence relation between a scene contained in the captured image 12 and a scene in the real world seen through the display apparatus 60, a location, a shape, and the like of information (a first display 30, a second display 90, and the like) that the display apparatus 60 is made to display. Note that the correspondence relation between a scene contained in the captured image 12 and a scene in the real world seen through the display apparatus 60 can be determined based on camera parameters or the like of the camera 10 generating the captured image 12.

When a transmission-type head-mounted display is used as described above, operation of selecting a first display 30, inputting product identification information, or the like are achieved by, for example, a gesture (for example, an operation of stopping a finger at a location overlapping a first display 30) performed by a user captured by the camera 10. As a technique in which a head-mounted display recognizes an input operation, such as a gesture, of a user, any existing technique can be used.

The whole or part of the example embodiments disclosed above can be described as, but not limited to, the following supplementary notes.

1. An information processing apparatus including:
   a determination unit that determines whether a predetermined condition is satisfied with respect to feature information of a product, the feature information being stored in a storage apparatus in conjunction with product identification information; and
   a deletion unit that deletes the feature information with respect to which the predetermined condition is satisfied from the storage apparatus, in which the feature information of the product indicates at least one of an image of the product and an image feature extracted from the image of the product.

2. The information processing apparatus according to supplementary note 1, in which
   the predetermined condition includes at least one of a condition requiring that a feature point obtained with respect to an object contained in the product image indicated by the feature information is equal to or less than a predetermined value and a condition requiring that an image feature indicated by the feature information is an image feature extracted from a product image where a feature point obtained with respect to the object is equal to or less than a predetermined value.

3. The information processing apparatus according to supplementary note 1, in which
   the predetermined condition includes at least one of a condition requiring that the feature information has not been determined for a predetermined period or longer to have a degree of similarity to feature information obtained from an object to be recognized in product recognition, the degree of similarity being equal to or greater than a predetermined value, and a condition requiring that frequency at which the feature information is determined to have a degree of similarity to feature information obtained from an object to be recognized in product recognition, the degree of similarity being equal to or greater than a predetermined value, is equal to or less than a predetermined value.

4. The information processing apparatus according to supplementary note 3, in which
   the predetermined condition includes a condition requiring that it has not been determined for a predetermined period or longer that a degree of similarity between the feature information and feature information obtained from an object to be recognized in product recognition is equal to or greater than a predetermined value and, in product recognition that has been performed during the predetermined period, other feature information associated with the product identification information being associated with the feature information has been determined to have a degree of similarity to feature information obtained from an object to be recognized, the degree of similarity being equal to or greater than the predetermined value.

5. The information processing apparatus according to supplementary note 1, in which
   the predetermined condition includes a condition requiring that a degree of similarity between the feature information and other feature information associated with the product identification information being associated with the feature information is equal to or greater than a predetermined value.

6. The information processing apparatus according to any one of supplementary notes 2 to 5, in which
   the predetermined condition includes a condition requiring that a total number of pieces of feature information associated with the product identification information being associated with the feature information is equal to or greater than a predetermined number.

7. A control method being executed by a computer, the method including:
   a determination step of determining whether a predetermined condition is satisfied with respect to feature information of a product, the feature information being stored in a storage apparatus in conjunction with product identification information; and
   a deletion step of deleting the feature information with respect to which the predetermined condition is satisfied from the storage apparatus, in which the feature information of the product indicates at least one of an image of the product and an image feature extracted from the image of the product.

8. The control method according to supplementary note 7, in which the predetermined condition includes at least one of a condition requiring that a feature point obtained with respect to an object contained in a product image indicated by the feature information is equal to or less than a predetermined value and a condition requiring that an image feature indicated by the feature information is an image feature extracted from the product image where a feature point obtained with respect to the object is equal to or less than a predetermined value.

9. The control method according to supplementary note 7, in which the predetermined condition includes at least one of a condition requiring that the feature information has not been determined for a predetermined period or longer to have a degree of similarity to feature information obtained from an object to be recognized in product recognition, the degree of similarity being equal to or greater than a predetermined value, and a condition requiring that frequency at which the feature information is determined to have a degree of similarity to feature information obtained from an object to be recognized in product recognition, the degree of similarity being equal to or greater than a predetermined value, is equal to or less than a predetermined value.

10. The control method according to supplementary note 9, in which the predetermined condition includes a condition requiring that it has not been determined for a predetermined period or longer that a degree of similarity between the feature information and feature information obtained from an object to be recognized in product recognition is equal to or greater than a predetermined value and, in product recognition that has been performed during the predetermined period, other feature information associated with the product identification information being associated with the feature information has been determined to have a degree of similarity to feature information obtained from an object to be recognized, the degree of similarity being equal to or greater than the predetermined value.

11. The control method according to supplementary note 7, in which the predetermined condition includes a condition requiring that a degree of similarity between the feature information and other feature information associated with the product identification information being associated with the feature information is equal to or greater than a predetermined value.

12. The control method according to any one of supplementary notes 8 to 11, in which the predetermined condition includes a condition requiring that a total number of pieces of feature information associated with the product identification information being associated with the feature information is equal to or greater than a predetermined number.

13. A program causing a computer to execute respective steps of the control method according to any one of supplementary notes 7 to 12.

This application is based upon and claims the benefit of priority from Japanese Patent Application No. 2018-053452, filed on Mar. 20, 2018, the disclosure of which is incorporated herein in its entirety by reference.

The invention claimed is:

1. An information processing apparatus comprising:
a determination unit that determines whether a predetermined condition is satisfied with respect to feature information of a product, the feature information being stored in a storage apparatus in conjunction with product identification information; and
a deletion unit that deletes the feature information with respect to which the predetermined condition is satisfied from the storage apparatus, wherein
the feature information of the product indicates at least one of a product image of the product and an image feature extracted from the product image, wherein
the predetermined condition includes at least one of a condition requiring that the feature information has not been determined for a predetermined period or longer to have a degree of similarity to feature information obtained from an object to be recognized in product recognition, the degree of similarity being equal to or greater than a predetermined value, and a condition requiring that frequency at which the feature information is determined to have a degree of similarity to feature information obtained from an object to be recognized in product recognition, the degree of similarity being equal to or greater than a predetermined value, is equal to or less than a predetermined value, and
the predetermined condition includes a condition requiring that it has not been determined for a predetermined period or longer that a degree of similarity between the feature information and feature information obtained from an object to be recognized in product recognition is equal to or greater than a predetermined value and, in product recognition that has been performed during the predetermined period, other feature information associated with the product identification information being associated with the feature information has been determined to have a degree of similarity to feature information obtained from an object to be recognized, the degree of similarity being equal to or greater than the predetermined value.

2. The information processing apparatus according to claim 1, wherein
the predetermined condition further includes at least one of a condition requiring that the number of feature points obtained with respect to an object contained in the product image indicated by the feature information is equal to or less than a predetermined value and a condition requiring that an image feature indicated by the feature information is an image feature extracted from the product image where the number of the feature points obtained with respect to the object is equal to or less than a predetermined value.

3. The information processing apparatus according to claim 1, wherein
the predetermined condition further includes a condition requiring that a degree of similarity between the feature information and other feature information associated with the product identification information being associated with the feature information is equal to or greater than a predetermined value.

4. The information processing apparatus according to claim 2, wherein
the predetermined condition further includes a condition requiring that a total number of pieces of feature information associated with the product identification information being associated with the feature information is equal to or greater than a predetermined number.

5. A control method being executed by a computer, the method comprising:
    determining whether a predetermined condition is satisfied with respect to feature information of a product, the feature information being stored in a storage apparatus in conjunction with product identification information; and
    deleting the feature information with respect to which the predetermined condition is satisfied from the storage apparatus, wherein
    the feature information of the product indicates at least one of a product image of the product and an image feature extracted from the product image, wherein
    the predetermined condition includes at least one of a condition requiring that the feature information has not been determined for a predetermined period or longer to have a degree of similarity to feature information obtained from an object to be recognized in product recognition, the degree of similarity being equal to or greater than a predetermined value, and a condition requiring that frequency at which the feature information is determined to have a degree of similarity to feature information obtained from an object to be recognized in product recognition, the degree of similarity being equal to or greater than a predetermined value, is equal to or less than a predetermined value, and
    the predetermined condition includes a condition requiring that it has not been determined for a predetermined period or longer that a degree of similarity between the feature information and feature information obtained from an object to be recognized in product recognition is equal to or greater than a predetermined value and, in product recognition that has been performed during the predetermined period, other feature information associated with the product identification information being associated with the feature information has been determined to have a degree of similarity to feature information obtained from an object to be recognized, the degree of similarity being equal to or greater than the predetermined value.

6. The control method according to claim 5, wherein
    the predetermined condition further includes at least one of a condition requiring that the number of feature points obtained with respect to an object contained in the product image indicated by the feature information is equal to or less than a predetermined value and a condition requiring that an image feature indicated by the feature information is an image feature extracted from the product image where the number of feature points obtained with respect to the object is equal to or less than a predetermined value.

7. The control method according to claim 5, wherein
    the predetermined condition further includes a condition requiring that a degree of similarity between the feature information and other feature information associated with the product identification information being associated with the feature information is equal to or greater than a predetermined value.

8. The control method according to claim 6, wherein
    the predetermined condition further includes a condition requiring that a total number of pieces of feature information associated with the product identification information being associated with the feature information is equal to or greater than a predetermined number.

9. A non-transitory computer readable storage medium having a program causing a computer to execute:
    a procedure for determining whether a predetermined condition is satisfied with respect to feature information of a product, the feature information being stored in a storage apparatus in conjunction with product identification information; and
    a procedure for deleting the feature information with respect to which the predetermined condition is satisfied from the storage apparatus, wherein
    the feature information of the product indicates at least one of a product image of the product and an image feature extracted from the product image,
    wherein the predetermined condition includes at least one of a condition requiring that the feature information has not been determined for a predetermined period or longer to have a degree of similarity to feature information obtained from an object to be recognized in product recognition, the degree of similarity being equal to or greater than a predetermined value, and a condition requiring that frequency at which the feature information is determined to have a degree of similarity to feature information obtained from an object to be recognized in product recognition, the degree of similarity being equal to or greater than a predetermined value, is equal to or less than a predetermined value, and
    the predetermined condition includes a condition requiring that it has not been determined for a predetermined period or longer that a degree of similarity between the feature information and feature information obtained from an object to be recognized in product recognition is equal to or greater than a predetermined value and, in product recognition that has been performed during the predetermined period, other feature information associated with the product identification information being associated with the feature information has been determined to have a degree of similarity to feature information obtained from an object to be recognized, the degree of similarity being equal to or greater than the predetermined value.

* * * * *